(12) United States Patent
Yang et al.

(10) Patent No.: US 12,272,841 B2
(45) Date of Patent: Apr. 8, 2025

(54) BATTERY CONTAINER

(71) Applicant: LG ENERGY SOLUTION, LTD., Seoul (KR)

(72) Inventors: Mun-Seok Yang, Daejeon (KR); Yo-Hwan Kim, Daejeon (KR); Ji-Hun Kim, Daejeon (KR); Hong-Jae Park, Daejeon (KR); Seung-Jun Lee, Daejeon (KR); Ji-Won Lee, Daejeon (KR); Hyun-Min Lee, Daejeon (KR); Hyung-Uk Lee, Daejeon (KR); Tae-Shin Cho, Daejeon (KR); Ji-Ho Yoo, Daejeon (KR); Sung-Han Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/634,226

(22) Filed: Apr. 12, 2024

(65) Prior Publication Data

US 2024/0258655 A1    Aug. 1, 2024

Related U.S. Application Data

(63) Continuation of application No. PCT/KR2023/000988, filed on Jan. 19, 2023.

(30) Foreign Application Priority Data

Jan. 19, 2022    (KR) ........................ 10-2022-0008035

(51) Int. Cl.
*H01M 50/507*    (2021.01)
*A62C 3/16*    (2006.01)
(Continued)

(52) U.S. Cl.
CPC ............. *H01M 50/507* (2021.01); *A62C 3/16* (2013.01); *H01M 10/613* (2015.04);
(Continued)

(58) Field of Classification Search
CPC ............. H01M 50/507; H01M 10/613; H01M 10/627; H01M 10/663; H01M 50/209;
(Continued)

(56) References Cited

U.S. PATENT DOCUMENTS

2018/0226774 A1    8/2018  Chen et al.
2022/0285760 A1    9/2022  Jung et al.

FOREIGN PATENT DOCUMENTS

CA    3 038 678 A1    4/2018
CN    208352369    *    1/2019
(Continued)

OTHER PUBLICATIONS

International Search Report for PCT/KR2023/000988 (PCT/ISA/210) mailed on May 18, 2023.
European Search Report for European Application No. 23743516.9, dated Nov. 12, 2024.

*Primary Examiner* — Lisa S Park
(74) *Attorney, Agent, or Firm* — Birch, Stewart, Kolasch & Birch, LLP

(57) ABSTRACT

A battery container has excellent workability, assembly, expandability, and safety. The battery container includes at least one battery rack including a plurality of battery modules; a container housing having an empty space formed therein to accommodate the battery rack; a plurality of main connectors located on at least one side of the container housing and configured to be electrically connected to the outside; and a main bus bar connected between the plurality of main connectors to transmit power.

19 Claims, 23 Drawing Sheets

(51) Int. Cl.
*H01M 10/613* (2014.01)
*H01M 10/627* (2014.01)
*H01M 10/663* (2014.01)
*H01M 50/209* (2021.01)
*H01M 50/251* (2021.01)
*H01M 50/30* (2021.01)

(52) U.S. Cl.
CPC ....... *H01M 10/627* (2015.04); *H01M 10/663* (2015.04); *H01M 50/209* (2021.01); *H01M 50/251* (2021.01); *H01M 50/30* (2021.01); *H01M 2220/10* (2013.01)

(58) Field of Classification Search
CPC ............... H01M 50/251; H01M 50/30; H01M 2220/10; A62C 3/16
See application file for complete search history.

(56) References Cited

FOREIGN PATENT DOCUMENTS

| | | | |
|---|---|---|---|
| CN | 211062762 | * | 7/2020 |
| CN | 214411360 U | | 10/2021 |
| JP | 2010186568 | * | 8/2010 |
| KR | 10-2019-0014989 A | | 2/2019 |
| KR | 10-2020-0028619 A | | 3/2020 |
| KR | 10-2106153 B1 | | 5/2020 |
| KR | 10-2021-0056268 A | | 5/2021 |
| KR | 10-2021-0087844 A | | 7/2021 |
| KR | 10-2277341 B1 | | 7/2021 |
| KR | 102277341 | * | 7/2021 |
| WO | WO2020/055809 A1 | | 3/2020 |
| WO | WO2020/091721 A1 | | 5/2020 |
| WO | WO 2020/112618 A1 | | 6/2020 |

* cited by examiner

BATTERY CONTAINER

CROSS REFERENCE TO RELATED APPLICATIONS

The present application is a continuation of PCT/KR2023/000988, filed Jan. 19, 2023, and claims priority to Korean Patent Application No. 10-2022-0008035 filed on Jan. 19, 2022, in the Republic of Korea, the disclosures of which are incorporated herein by reference.

TECHNICAL FIELD

The present disclosure relates to a battery, and more particularly, to a battery container applied to an energy storage system.

BACKGROUND

In recent times, a surge in energy-related challenges, including power shortages and the growing emphasis on eco-friendly energy solutions, has placed the spotlight on energy storage systems (ESS). Notably, ESS has emerged as a pivotal solution for storing generated power.

For instance, the concept of a smart grid system has been proposed for effectively managing power supply and demand, recognizing that consumer electricity consumption is often variable and subject to fluctuations. The strategic integration of an ESS facilitates the establishment of power management systems, such as smart grid systems, which can adeptly regulate power supply and demand in specific regions or urban areas. In addition, the proliferation of electric vehicles (EVs) in the commercial landscape has created an opportunity to implement ESS in electric charging stations designed for EVs.

ESS configurations may take various forms, but they typically include at least one battery container. The battery container is usually a housing designed to accommodate components and is reminiscent of larger shipping containers, which are transportable by both land and sea. These battery containers often bear substantial dimensions, akin to the standard 20-foot or a 40-foot shipping containers described above. The term "container" serves to underscore the significant size of the battery container used in ESS applications.

Within the battery container, a number of batteries may be connected in series and/or parallel to each other. These batteries may be stacked, using for example rack frames or distinct fixed structures, forming a battery rack. Each battery container typically houses at least one battery rack.

In the context of ESS used in smart grid systems and similar applications, multiple battery containers may be connected to each other to increase charge and discharge capacity. Nonetheless, these large battery containers present challenges related to transportation and installation. Their substantial size and weight can make post-positioning mobility of the battery container extremely cumbersome. As a result, the connection of a plurality of battery containers in the field necessitates meticulous process design and a high degree of skill on the part of workers, often elongating the installation timeline of such battery containers.

Furthermore, conventional battery containers are often not easily amenable to additional connections. Once a plurality of containers have been connected together for ESS deployment, connecting additional new battery containers becomes a daunting task, further hindering the adjustment and expansion of the ESS value chain. To illustrate, when installing a pre-existing ESS, direct DC-connection of a battery container to a Power Conversion/Conditioning System (PCS) often requires extensive groundwork, particularly if the distance between the battery container and the PCS is substantial, necessitating lengthy DC lines. Consequently, the installation process may become even more intricate, time-consuming, and financially burdensome.

Furthermore, the need for an ideal battery container extends beyond mere workability and expandability; it encompasses a demand for a diverse range of features, including high energy density and robust first-safety capabilities.

DISCLOSURE

Technical Problem

The present disclosure is designed to solve the problems of the related art, and therefore the present disclosure is directed to providing a battery container with improved workability, assembly, expandability, and safety.

However, the technical problem to be solved by the present disclosure is not limited to the above, and other problems not mentioned herein will be clearly understood by those skilled in the art from the following disclosure.

Technical Solution

In one aspect of the present disclosure, there is provided a battery container, comprising: at least one battery rack including a plurality of batteries; a container housing having an inner space formed therein to accommodate the at least one battery rack and a connector accommodation portion having a concave shape and formed on a first side of the container housing; a first main connector located in the connector accommodation portion of the container housing on the first side of the container housing, the first main connector being configured to be electrically connected to the outside; and a main bus bar connected to the first main connector to transmit power.

Here, the main bus bar may be configured to transmit DC power.

In addition, the main bus bar may be disposed in the inner space of the container housing.

In addition, the first main connector may be configured to be exposed to outside of the container housing.

In addition, the first main connector may be located at an upper side of the container housing.

In addition, wherein the connector accommodation portion may be formed to be opened in upper and side directions at a top edge portion of the container housing.

In addition, the battery container according to the present disclosure may further comprise a connector cover configured to cover an outer side of the connector accommodation portion.

In addition, the battery container according to the present disclosure may further comprise a link cover configured to be coupled to a side of the connector accommodation portion and configured to surround a link bus bar connected to the main connector.

In addition, the battery container according to the present disclosure may further comprise an air conditioning module configured to regulate the inner space of the container housing.

In addition, the battery container according to the present disclosure may further comprise a venting module configured to discharge an internal gas of the container housing to the outside.

In addition, the battery container according to the present disclosure may further comprise a firefighting module configured to supply a fire extinguishing liquid supplied from outside to the battery rack.

In addition, the firefighting module may be configured to supply the fire extinguishing liquid supplied from the outside to another battery container.

In another aspect of the present disclosure, there is also provided an energy storage system, comprising the battery container according to the present disclosure.

The battery container may further include a second main connector located on a second side of the container housing, the second side being opposite to the first side, wherein the main bus extends between the first main connector and the second main connector.

The connector accommodation portion may be formed at a junction of a top wall and the first side wall of the battery container, and the first main connector is located in the connector accommodation portion of the container housing, wherein a first cover attaches to the top wall and closes a top of the connector accommodation portion, and wherein a second cover attaches to the side wall and closes a side of the connector accommodation portion.

In one aspect of the present disclosure, there is provided a battery container including at least one battery rack including a plurality of batteries, a container housing having an inner space formed therein to accommodate the at least one battery rack and a connector accommodation portion having a concave shape and formed on an upper portion of a first side of the container housing, a first main connector located in the connector accommodation portion of the container housing on the upper portion of the first side of the container housing, the first main connector being configured to be electrically connected to the outside and a main bus bar connected to the first main connector to transmit DC power, wherein the main bus bar is disposed in the inner space of the container housing.

The first main connector is further configured to be exposed to outside of the container housing.

The battery container may further include a connector cover configured to cover an outer side of the connector accommodation portion.

The battery container may further include a link cover configured to be coupled to a side of the connector accommodation portion and configured to surround a link bus bar connected to the first main connector.

The battery container may further include an air conditioning module configured to regulate the inner space of the container housing, a venting module configured to discharge an internal gas of the container housing to the outside and a firefighting module configured to supply a fire extinguishing liquid supplied from outside to the battery rack.

Advantageous Effects

According to an aspect of the present disclosure, a battery container with improved workability, assembly, installation convenience, or the like may be provided.

In addition, in the present disclosure, a battery container with excellent expandability that may easily respond to the change of an ESS value chain may be provided. In particular, according to the present disclosure, a level product solution of an energy storage system with high differentiation compared to the prior art may be provided.

In addition, according to an aspect of the present disclosure, transportation and installation may be performed in a state where the battery modules and various accessories are all mounted inside one enclosure. Therefore, on-site installation is minimized along with transportation to the ESS construction area, and expansion convenience may be improved.

Moreover, according to an aspect of the present disclosure, on-site fastening points and installation time may be reduced. In addition, according to an aspect of the present disclosure, ground work may be reduced during on-site installation.

In order to build an energy storage system including a plurality of battery containers, DC power is typically connected by line from each battery container to the PCS. This requires expensive and time-consuming ground work. Further, as the distance is longer, it is required to apply a longer DC line, resulting in even more ground work. However, according to an aspect of the present disclosure, since there is no need to directly connect a DC power to the PCS for each battery container, installation is facilitated, and installation time and material cost may be significantly reduced.

Also, according to an aspect of the present disclosure, energy density may be improved due to a more compact structure.

In addition, according to an aspect of the present disclosure, it may be advantageous for integrated environment control through Power Line Communication (PLC).

In addition, according to an aspect of the present disclosure, a battery container with improved safety in the event of a fire or the like may be provided.

Moreover, according to an aspect of the present disclosure, when an energy storage system is constructed using a plurality of battery containers, the convenience of building a firefighting system may be improved.

In addition, according to an aspect of the present disclosure, a battery container having excellent cooling performance may be provided.

In addition, several other additional effects may be achieved by various aspects of the present disclosure. Various effects of the present disclosure will be described in detail in each aspect, or the effects that can be easily understood by those skilled in the art will be not be described in detail.

DESCRIPTION OF DRAWINGS

The accompanying drawings illustrate a preferred aspect of the present disclosure and together with the foregoing disclosure, serve to provide further understanding of the technical features of the present disclosure, and thus, the present disclosure is not construed as being limited to the drawing.

BEST MODE

Hereinafter, preferred aspects of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Meanwhile, in the present specification, the terms indicating directions such as "upper", "lower", "left", "right", "front", and "rear" may be used, but these terms are only for convenience of description, and it is obvious to those skilled in the art disclosure that these terms may vary depending on the location of a target object or the location of an observer. In particular, in each drawing, it may be regarded that the X-axis direction represents a left and right direction, the Y-axis direction represents a front and rear direction, and the Z-axis direction represents an upper and lower direction, respectively.

Also, in this specification, the terms such as "inside" or "outside" may be used for each component, and, unless otherwise specified, the "inside" may mean a direction toward the central portion in each component, and the "outside" may mean a direction opposite thereto.

In addition, in this specification, several aspects may be included, and for each aspect, features identical or similar to those of other aspects may not be described in detail, and features different therefrom will be described in detail.

Figure 1:
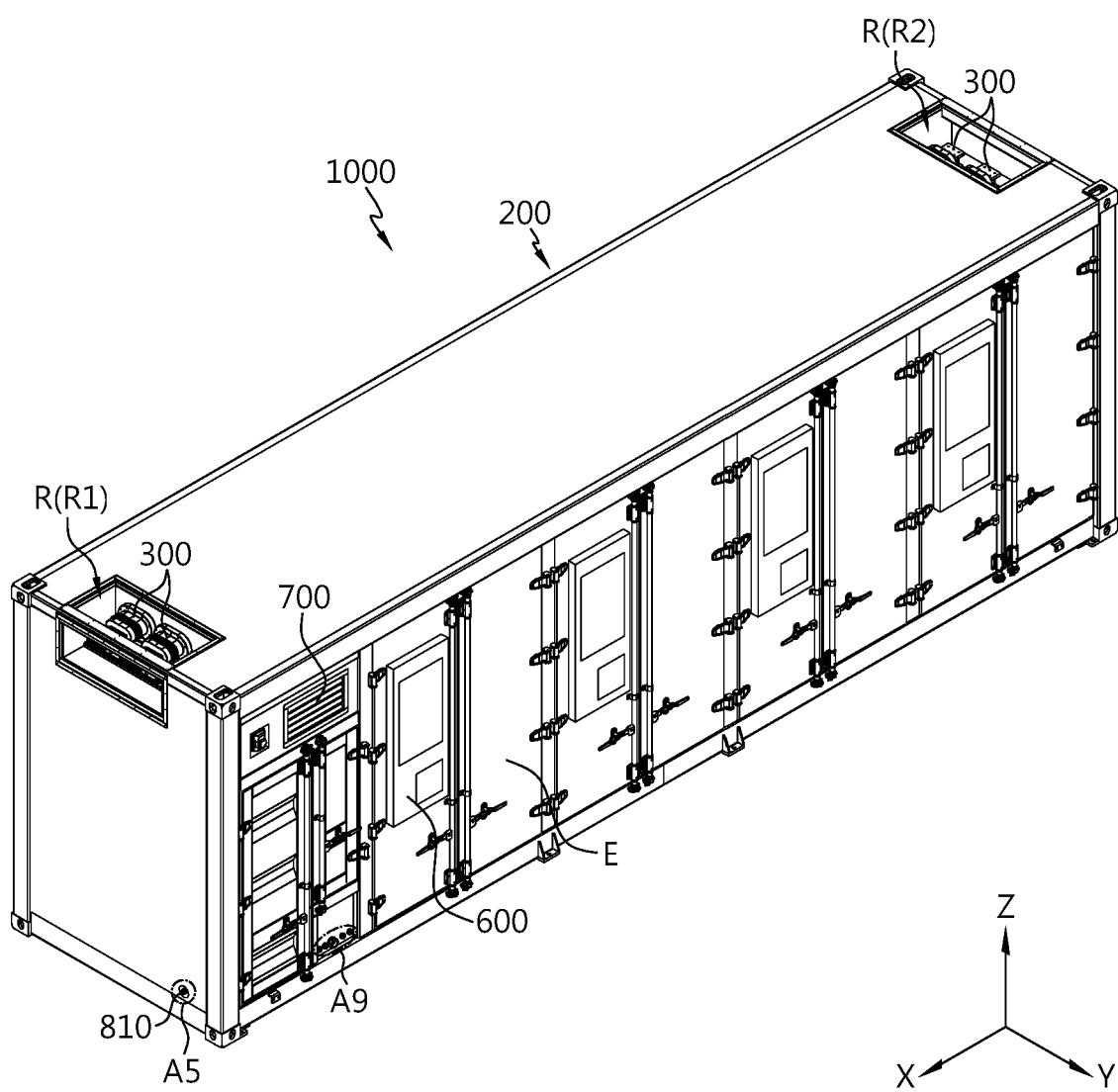
FIG. 1 is a perspective view schematically showing the configuration of a battery container according to an aspect of the present disclosure.
Figure 2:
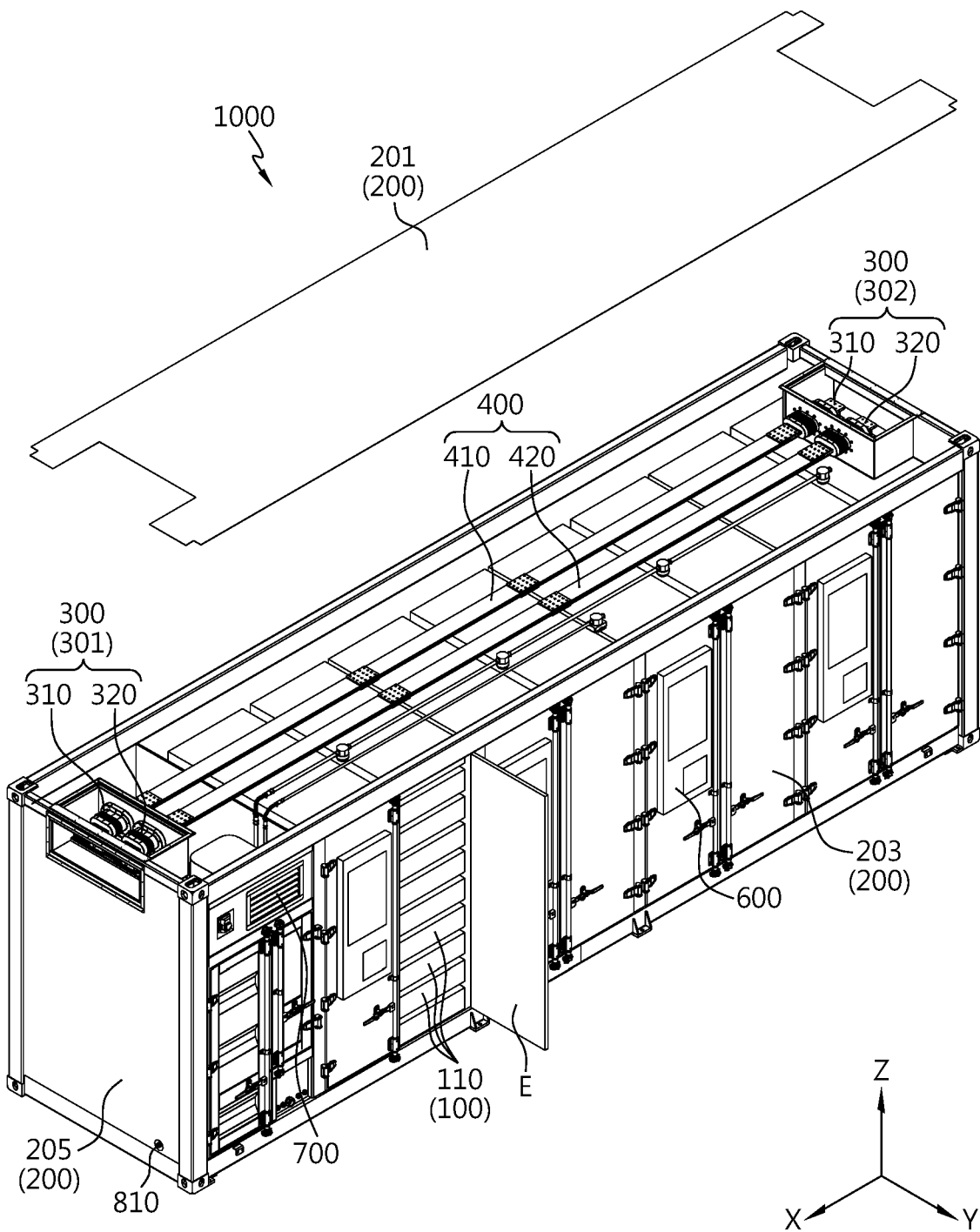
FIG. 2 is a perspective view schematically showing a form in which some components of the battery container are separated or moved according to an aspect of the present disclosure.
Figure 3:
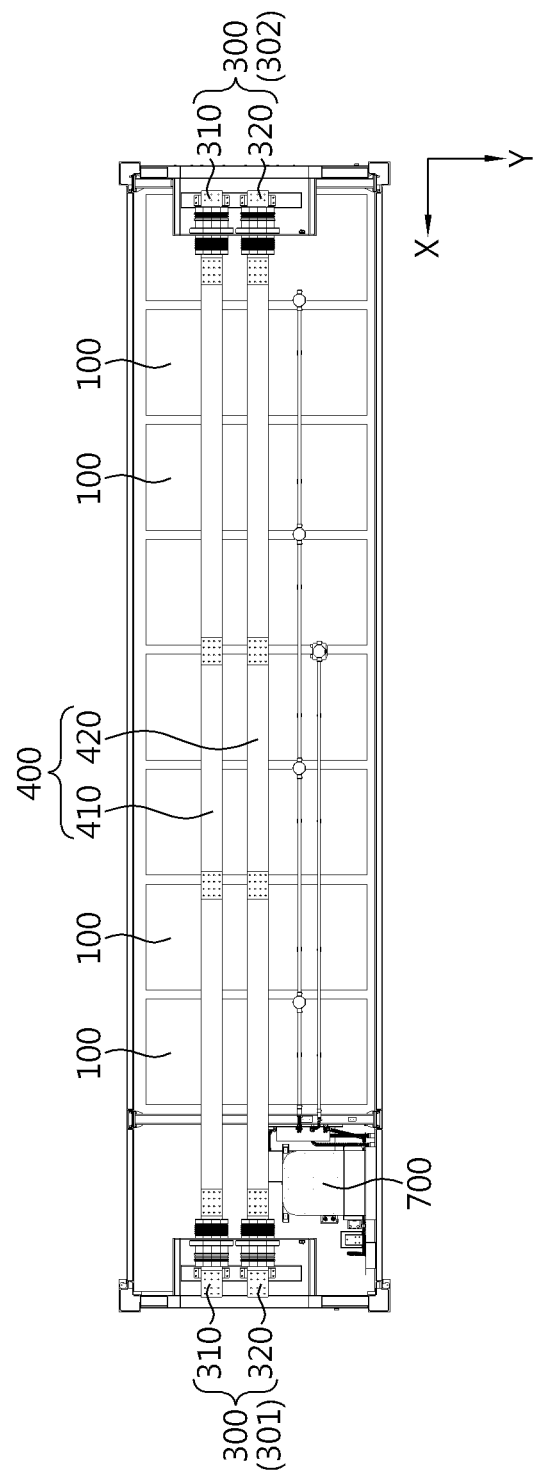
FIG. 3 is a diagram showing the internal configuration of the battery container according to an aspect of the present disclosure, viewed from above.

FIG. 1 is a perspective view schematically showing the configuration of a battery container 1000 according to an aspect of the present disclosure. Also, FIG. 2 is a perspective view schematically showing a form in which some components of the battery container 1000 are separated or moved according to an aspect of the present disclosure. FIG. 3 is a diagram showing the internal configuration of the battery container 1000 according to an aspect of the present disclosure, viewed from above.

Referring to FIGS. 1 to 3, a battery container 1000 according to the present disclosure includes a battery rack 100, a container housing 200, a main connector 300, and a main bus bar 400.

The battery rack 100 may include a plurality of battery modules 110. Here, each battery module 110 may be configured in a form in which a plurality of battery cells (secondary batteries) are accommodated in a module case. In addition, the battery modules 110 may be stacked in one direction, such as in an upper and lower direction, to form a battery rack 100. In particular, the battery rack 100 may include a rack case to facilitate stacking of the battery modules 110. In this case, a plurality of battery modules 110 may be accommodated in respective storage spaces provided in the rack case to form a module stack.

The battery module 110 included in the battery rack 100 may further include a control unit such as a battery management system (BMS) for each group or certain groups. For example, a separate pack BMS may be provided for each battery module 110. In this case, each battery module 110 may be referred to as a battery pack. That is, it may be regarded that the battery rack 100 includes a plurality of battery packs. In various descriptions below, the battery module 110 may be replaced with a battery pack.

One or more battery racks 100 may be included in the battery container 1000. In particular, a plurality of battery racks 100 may be included in the battery container 1000. Also, the plurality of battery racks 100 may be disposed in at least one direction, for example, in a horizontal direction. For example, eight battery racks 100 may be included in the battery container 1000, and the plurality of battery racks 100 may be arranged in left and right directions (X-axis direction) inside the battery container 1000. When a plurality of battery racks 100 are included, a separate control unit, such as a rack BMS, may be provided for each battery rack 100. In this case, the rack BMS may be connected to the plurality of pack BMSs to exchange data and control the plurality of pack BMSs. Meanwhile, when the battery container 1000 includes at least one rack BMS, the rack BMS may be connected to a separate control device provided outside the battery container 1000, such as a control container. In addition, the control container may be connected to a rack BMS or a pack BMS of the battery container 1000 to control the same or exchange data with the same.

An empty space may be formed inside the container housing 200. Also, the container housing 200 may accommodate the battery rack 100 in the inner space. More specifically, the container housing 200 may be formed in a substantially rectangular parallelepiped shape, as shown in FIG. 1 and the like. In this case, the container housing 200 may include an upper housing 201, a lower housing, a front housing 203, a rear housing, a left housing 205, and a right housing around the inner space. Also, the container housing 200 may accommodate the battery rack 100 in the inner space defined by these six unit housings.

The container housing 200 may be made of a material that secures a certain level of rigidity and stably protects internal components from external physical and chemical factors. For example, the container housing 200 may be made of a metal material, such as steel, or may have such a metal material.

The container housing may have a size identical or similar to the size of a shipping container. In addition, the container housing may follow the standards of a shipping container predetermined according to the ISO standards or the like. For example, the container housing may be designed with identical or similar dimensions as a 20-foot container or a 40-foot container. However, the size of the container housing may be appropriately designed depending on the situation. In particular, the size or shape of the container housing may be set variously according to the construction scale, shape, topography, or the like of a system to which the battery container is applied, such as an energy storage system. The present disclosure may not be limited by to the size or shape of the container housing.

The main connector 300 may be configured to be electrically connected to the outside. That is, with respect to the battery container 1000, the main connector 300 may be configured to be connected to another component outside the battery container 1000, for example another battery container 1000 or a control container equipped with a control unit such as a battery system controller (BSC).

The main connector 300 may be located on at least one side of the container housing 200. For example, the main connector 300 may be located on the left or right side of the container housing 200. Moreover, a plurality of main connectors 300 may be included in the battery container 1000. For example, as shown in FIGS. 2 and 3, the main connector 300 may include two main connectors 300, namely a first connector 301 and a second connector 302.

The plurality of main connectors 300 may be located on different sides of the container housing 200. Moreover, the plurality of main connectors 300 may be located on opposite sides of the container housing 200. For example, seeing the aspect of FIGS. 1 to 3, the first connector 301 and the second connector 302 may be provided on the left and right sides of the container housing 200, respectively.

The main bus bar 400 may be configured to transmit power. In particular, the main bus bar 400 may serve as a path through which a charging power and a discharging power for the battery rack 100 included in the corresponding battery container 1000 are transmitted. To this end, the main bus bar 400 may be electrically connected to each terminal of the battery module 110 provided in the battery rack 100. Also, the main bus bar 400 may be connected to the main connector 300. Accordingly, the main bus bar 400 may serve as a path through which a charging power is transferred from the main connector 300 to the battery module 110. In addition, the main bus bar 400 may serve as a path through which a discharging power is transmitted from the battery module 110 to the main connector 300.

Moreover, the main bus bar 400 may function as a power transmission line between the plurality of main connectors 300. To this end, different ends of the main bus bar 400 may be connected to different main connectors 300. For example, the main bus bar 400 may be a power line elongated in one direction, for example in left and right directions. In this case, both ends of the main bus bar 400 may be connected to different main connectors 300, for example the first connector 301 and the second connector 302. Also, the main bus bar 400 may serve as a path for transmitting power between different main connectors 300, for example between the first connector 301 and the second connector 302.

The main bus bar 400 may include two unit bus bars, namely a positive electrode bus bar 410 and a negative electrode bus bar 420, in order to function as a power transmission path. The positive electrode bus bar 410 may be connected to a positive electrode terminal of the battery rack 100 or a positive electrode terminal of the battery module 110 included therein. Also, the negative electrode bus bar 420 may be connected to a negative electrode terminal of the battery rack 100 or a negative electrode terminal of the battery module 110 included therein.

In addition, the main connector 300 may be separately provided at each end of the positive electrode bus bar 410 and the negative electrode bus bar 420. For example, the first connector 301 and the second connector 302 may be provided at the left and right ends of the positive electrode bus bar 410, respectively. The first connector 301 and the second connector 302 provided at both ends of the positive electrode bus bar 410 may be a positive electrode connector 310. Also, the first connector 301 and the second connector 302 may be provided at the left end and the right end of the negative electrode bus bar 420, respectively. The two connectors provided at both ends of the negative electrode bus bar 420, namely the first connector 301 and the second connector 302, may all be negative electrode connectors 320.

According to this aspect, a battery system including a plurality of battery containers 1000 may be constructed more easily. This will be described in more detail with further reference to FIGS. 4 to 6.

Figure 4:
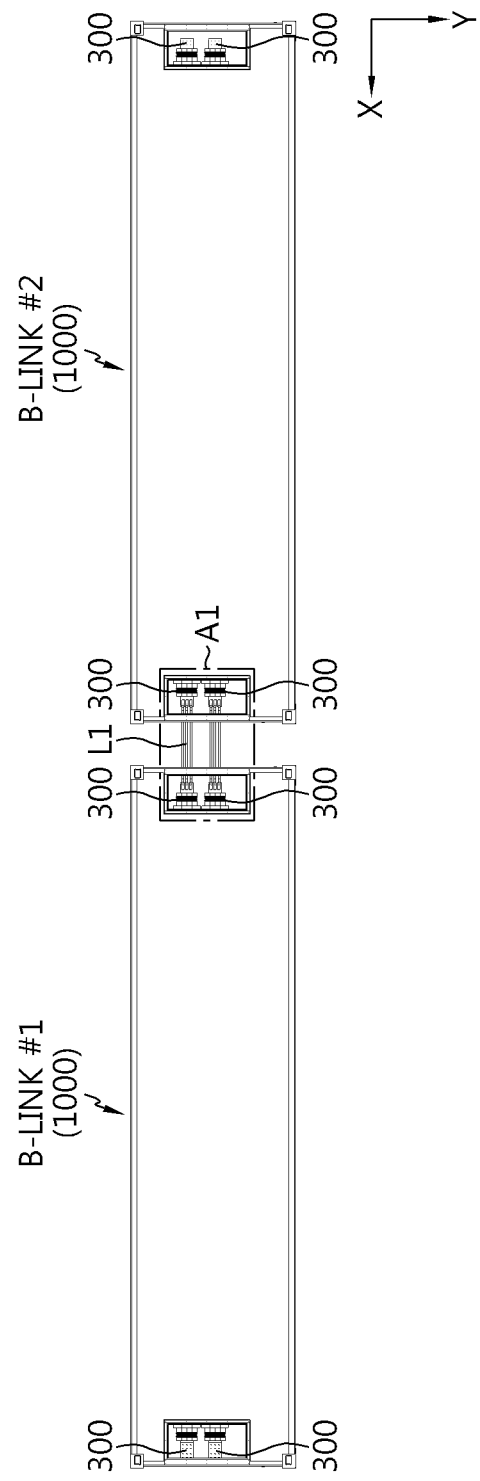
FIG. 4 is a top view schematically showing the configuration in which two battery containers according to an aspect of the present disclosure are connected.
Figure 5:
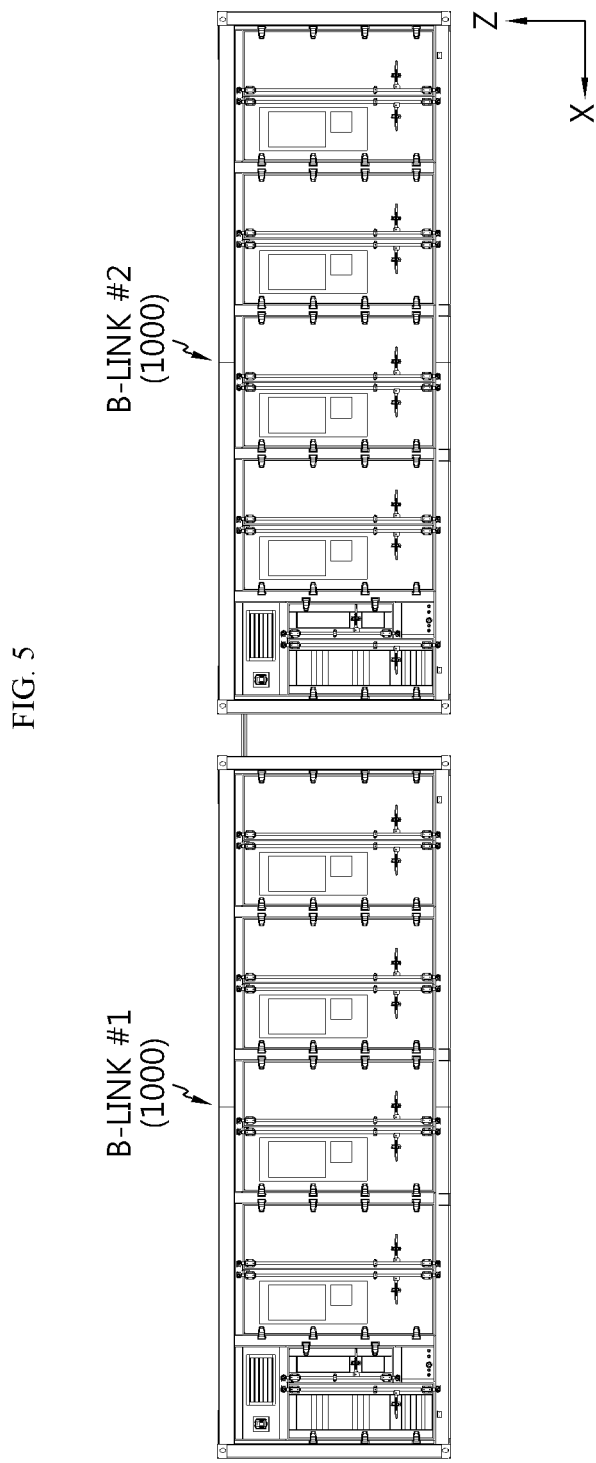
FIG. 5 is a front view showing the configuration of FIG. 4.
Figure 6:
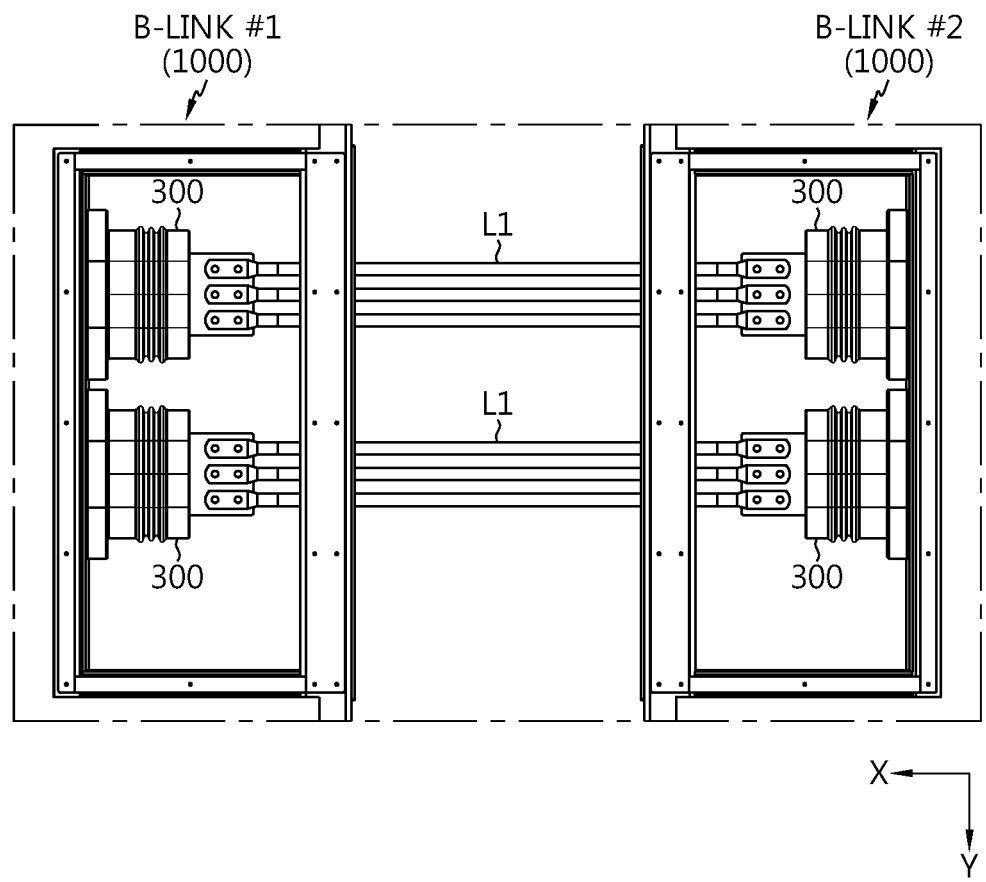
FIG. 6 is an enlarged view showing a connector connection portion of FIG. 4, viewed from above.

FIG. 4 is a top view schematically showing the configuration in which two battery containers 1000 according to an aspect of the present disclosure are connected. Also, FIG. 5 is a front view showing the configuration of FIG. 4, and FIG. 6 is an enlarged view showing a connector connection portion of FIG. 4, viewed from above. For example, FIG. 6 is an enlarged view of the portion A1 of FIG. 4.

Referring to FIGS. 4 to 6, two battery containers 1000, that is a first container indicated by B-LINK #1 and a second container indicated by B-LINK #2, are shown. In this case, the battery container 1000 shown in FIGS. 1 to 3 may be commonly applied to both the first container B-LINK #1 and the second container B-LINK #2.

In this aspect, two battery containers 1000 may be connected to each other through the main connector 300. To this end, two battery containers 1000 may be arranged so that their sides where the main connectors 300 are provided face each other. For example, in the aspect of FIGS. 4 to 6, since the main connectors 300 are provided on the left portion and the right portion of two battery containers 1000, two battery containers 1000 may be disposed side by side with each other in the left and right directions in a state where their sides where the main connectors 300 are provided face each other. In particular, in two battery containers 1000 disposed in the left and right directions, two battery containers 1000 may be connected to each other through the right main connector 300 of the first container B-LINK #1 disposed on the left side and the left main connector 300 of the second container B-LINK #2 disposed on the right side.

At this time, the two battery containers 1000 may be disposed to be spaced apart from each other by a predetermined distance in consideration of various factors such as tolerance, convenience of installation, physical damage prevention, and thermal blocking. For example, the first container B-LINK #1 and the second container B-LINK #2 may be disposed in the left and right directions with a separation distance of 10 cm to 20 cm. At this time, a separate connection member may be used to electrically connect the main connector 300 of the first container B-LINK #1 and the main connector 300 of the second container B-LINK #2 to each other. In particular, in constructing a battery system using the battery container 1000 according to the present disclosure, a link bus bar as indicated by L1 may be included as a member for connecting power between the battery containers 1000. In addition, one end of this link bus bar L1 may be connected to the main connector 300 of the first container B-LINK #1 and the other end may be connected to the main connector 300 of the second container B-LINK #2.

Moreover, since the main connector 300 includes a positive electrode connector 310 and a negative electrode connector 320, the link bus bar L1 may also have two link bus bars L1, namely a link bus bar for the positive electrode and a link bus bar for the negative electrode, as shown in FIGS. 4 and 6.

In particular, since the main connector 300 of each battery container 1000 is connected to the main bus bar 400, the link bus bar L1 may connect main bus bars 400 of different containers. In particular, since the main bus bar 400 may be configured to transfer a charging and discharging power for the battery container 1000, the link bus bar L1 may be configured to transfer a charging and discharging power between different battery containers 1000. For example, in the aspect shown in FIGS. 4 to 6, the link bus bar L1 may transfer a charging and discharging power between the first container B-LINK #1 and the second container B-LINK #2. More specifically, the power for charging the battery rack 100 included in the second container B-LINK #2 may be transferred from the main bus bar 400 of the first container B-LINK #1 through the link bus bar L1 to the main bus bar 400 of the second container B-LINK #2. In addition, the discharging power for the battery rack 100 of the second container B-LINK #2 may be transferred from the main bus bar 400 of the second container B-LINK #2 through the link bus bar L1 to the main bus bar 400 of the first container B-LINK #1.

According to this aspect, with respect to two battery containers 1000 disposed adjacently such that the main connectors 300 face each other, a power connection configuration may be easily achieved between two battery containers 1000 just by connecting both ends of the link bus bar L1 to the main connectors 300 of the two battery containers 1000, respectively. In particular, the battery container 1000 according to the present disclosure may provide a path through which a charging and discharging power for another external battery container 1000 is transferred. For example, in this aspect, the first container B-LINK #1 may provide a path through which a charging and discharging power of the second container B-LINK #2 is transferred. Accordingly, a power path for connecting to an external power system or the like may not be separately provided for every battery container 1000. For example, in this aspect, if the first container B-LINK #1 is connected to the power system, it is enough if the second container B-LINK #2 is connected to the first container B-LINK #1, and the second container B-LINK #2 need not be separately connected to the power system. Therefore, a long power path for the second container B-LINK #2 may not be provided. Therefore, in constructing a battery system using a plurality of battery containers 1000, installation convenience and assembly easiness are improved, and cost and work time may be reduced.

The main bus bar 400 may be configured to transmit a DC power as a charging and discharging power for the battery container 1000. That is, the power transferred through the main bus bar 400 may be a DC power. This will be described in more detail with further reference to FIG. 7.

Figure 7:
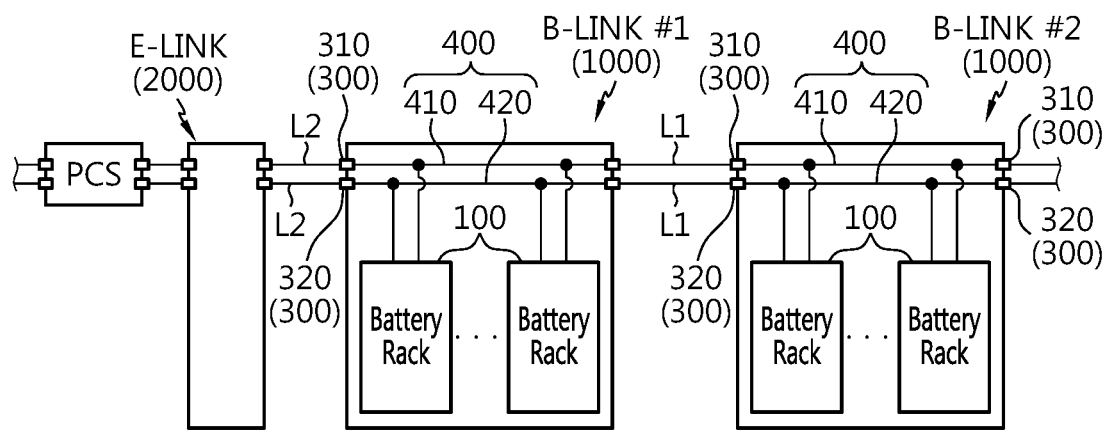
FIG. 7 is a diagram schematically showing some connection components of an energy storage system including the battery container according to an aspect of the present disclosure.

FIG. 7 is a diagram schematically showing some connection components of an energy storage system including the battery container 1000 according to an aspect of the present disclosure.

Referring to FIG. 7, two battery containers 1000 according to an aspect of the present disclosure, namely the first container B-LINK #1 and the second container B-LINK #2, are connected to each other through the link bus bar L1. In this case, each battery container 1000 may include a main connector 300, a main bus bar 400, and a plurality of battery racks 100 connected to the main bus bar 400. In addition, the two battery containers 1000 may be sequentially connected to a control container 2000 indicated by E-LINK and a power conversion system indicated by PCS. Here, the PCS may also be referred to as a power conditioning system. This type of energy storage system may be connected to a power system. In particular, the PCS may be configured to perform AC-DC conversion of power between the power system and the battery rack 100.

In this configuration, each battery container 1000 does not need to include its own AC/DC conversion module in the process of exchanging a charging and discharging power with the outside. Therefore, the main bus bar 400 of each battery container 1000 may be configured to transmit a DC power as a charging and discharging power.

In this aspect, a DC power connection configuration between the plurality of battery containers 1000 may be easily implemented by connecting only the main connectors 300 respectively provided in the plurality of battery containers 1000 to each other. At this time, it may be regarded that the main bus bars 400 of the plurality of battery containers 1000 are connected in series to each other. That is, the positive electrode connector 310 of the first container B-LINK #1 may be connected to the positive electrode connector 310 of the second container B-LINK #2, and the negative electrode connector 320 of the first container B-LINK #1 may be connected to the negative electrode connector 320 of the second container B-LINK #2. Therefore, the positive electrode bus bar 410 of the first container B-LINK #1 may be connected to the positive electrode bus bar 410 of the second container B-LINK #2, and the negative electrode bus bar 420 of the first container B-LINK

1 may be connected to the negative electrode bus bar 420 of the second container B-LINK #2.

In addition, it may be regarded that the battery racks 100 of the plurality of battery containers 1000 are connected in parallel to each other. For example, in the aspect of FIG. 7, the battery rack 100 included in each battery container 1000 may have a positive electrode terminal connected to the positive electrode bus bar 410 and a negative electrode terminal connected to the negative electrode bus bar 420. Therefore, it may be regarded that the battery rack 100 included in the first container B-LINK #1 and the battery rack 100 included in the second container B-LINK #2 are connected in parallel to each other.

Also, in this aspect, since a separate AC-DC conversion device does not need to be provided in the battery container 1000, the internal configuration of the battery container 1000 may be simplified. In addition, in this aspect, from the control container 2000 connected to the PCS, the second container B-LINK #2 located later than the first container B-LINK #1 only needs to be connected to the first container B-LINK #1, and does not need to be directly connected to the PCS or the control container 2000. That is, since the second container B-LINK #2 may exchange the charging and discharging power with the control container 2000 using the main bus bar 400 included in the first container B-LINK #1, there is no need to separately prepare a long power path for exchanging a charging and discharging power with the control container 2000. Therefore, in this aspect as well, an energy storage system is constructed very easily, and it may be advantageous to reduce costs and shorten the construction period when building a system.

Also, in the aspect of FIG. 7, another container, for example a third container, may be connected to the right side of the second container B-LINK #2. The third container is also a battery container according to an aspect of the present disclosure, and may have a configuration similar to the first container B-LINK #1 and the second container B-LINK #2. In particular, the main connector of the third container may be connected to the main connector 310 provided at the right end of the second container B-LINK #2. In this case, the charging and discharging power for the third container may be supplied from the control container 2000 and the PCS or transferred to the control container 2000 and the PCS via the first container B-LINK #1 and the second container B-LINK #2. In this case, expansion convenience may be improved when establishing a DC link of the battery container 1000.

The main bus bar 400 may be disposed in the inner space of the container housing 200. That is, the main bus bar 400 is embedded in the container housing 200 and may not be exposed to the outside. For example, as shown in FIG. 2, the main bus bar 400 may be located at the lower portion of the upper housing 201, particularly at the upper portion of the battery rack 100. That is, it may be regarded that the main bus bar 400 is built in the space between the battery rack 100 and the upper housing 201.

According to this aspect of the present disclosure, since the main bus bar 400 is configured to be embedded inside the battery container 1000, the main bus bar 400 may be transported and installed only by transporting and installing the battery container 1000. In addition, according to this aspect, external exposure of the power transmission path, namely the main bus bar 400, may be minimized, thereby reducing the risk of damage to the power transmission path and the possibility of electric leakage. Accordingly, the safety of the battery container 1000 or an energy storage system including the same may be improved.

Also, in this aspect, since the main bus bar 400 is located on the upper side of the battery rack 100, the interference of the battery rack 100 with respect to the main bus bar 400 may be avoided or minimized. Accordingly, the ease of manufacture of the battery container 1000 is improved, and the length of the main bus bar 400 may be minimized. In particular, in this aspect, the main bus bar 400 is configured to be elongated in a straight line shape, and does not need to have a separate curved section.

The plurality of main connectors 300 may be configured to be exposed to the outside of the container housing 200. For example, seeing the aspect of FIG. 1, two main connectors 300 may be exposed to the outside of the container housing 200. In particular, the plurality of main connectors 300 may be located on the outer surface of the container housing 200. That is, the main connector 300 may be provided on an outer wall, rather than in the inner space of the container housing 200.

In this case, even if a worker does not enter the inside of the container housing 200, the connection work for the main connector 300 may be easily performed outside the container housing 200. Therefore, a connection work between the battery containers 1000 or a connection work between the battery container 1000 and the control container 2000 may be more easily performed. Therefore, the installation or expansion convenience of the battery container 1000 may be further improved.

In addition, the main connector 300 may be located on the upper side of the container housing 200. For example, as shown in FIG. 1 and the like, the main connector 300 may be provided on the left upper part and the right upper part of the container housing 200, respectively. In this case, the connection work between the main connectors 300 may be easily performed. This will be described in more detail with reference to FIG. 8.

Figure 8:
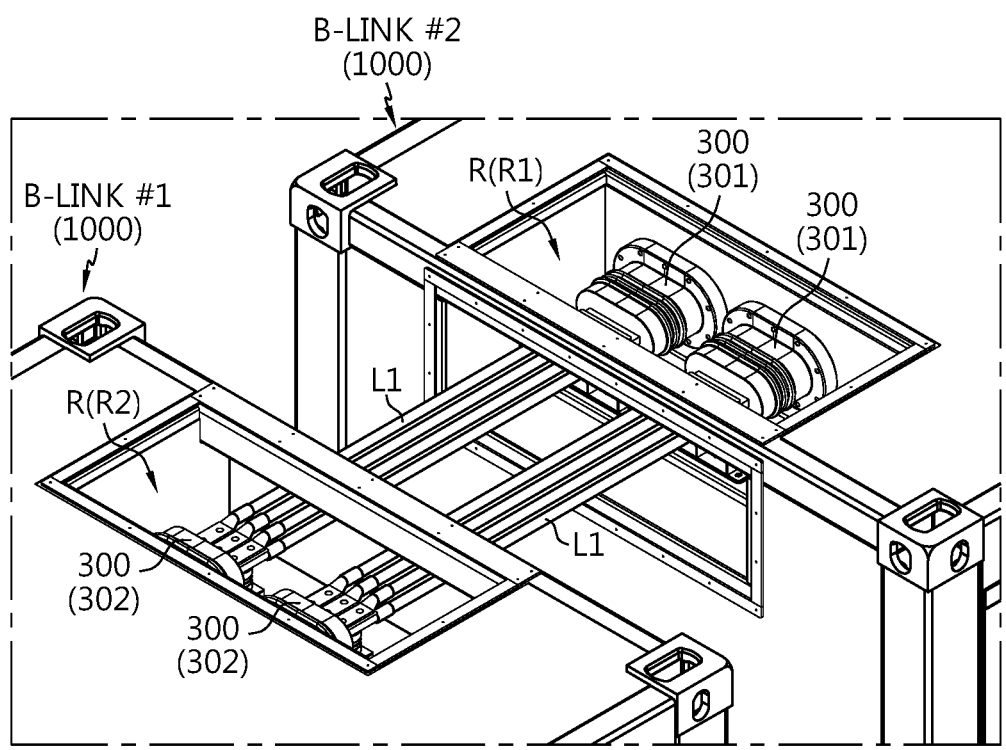
FIG. 8 is an enlarged view showing a portion where the battery container according to an aspect of the present disclosure is connected.

FIG. 8 is an enlarged view showing a portion where the battery container 1000 according to an aspect of the present disclosure is connected. For example, FIG. 8 may be an enlarged perspective view showing a portion in which two battery containers 1000 shown in FIG. 1 are provided so that the main connectors 300 are connected to each other.

Referring to FIG. 8, the second connector 302 may be provided as a main connector 300 on the right side of the first container B-LINK #1, and the first connector 301 may be provided as a main connector 300 on the left side of the second container B-LINK #2. In this case, the second connector 302 and the first connector 301 may be located on the upper side of the first container B-LINK #1 and the second container B-LINK #2, respectively. Moreover, the second connector 302 and the first connector 301 may be exposed to the outside.

In this aspect, a worker may easily connect the link bus bar L1 between the second connector 302 and the first connector 301 exposed to the outside by moving to the upper side of the first container B-LINK #1 and the second container B-LINK #2. Moreover, a worker does not need to enter the space between the battery containers 1000 to connect the two battery containers 1000. In this case, workability is improved, and the space between the two battery containers 1000 may be minimized. Therefore, the present disclosure may contribute to improving the energy density of the energy storage system or reducing the installation space.

In addition, according to this aspect, since the high-voltage connector is located high from the ground, the risk of submersion or electric leakage may be reduced. In addition, when the size of the battery container 1000 is greater than a certain level, like a shipping container, the possibility of contact with the main connector 300 during movement of a worker is low, so an electric shock accident or the like may be prevented in advance.

Meanwhile, when the main connector 300 is located on the upper side of the container housing 200, the main bus bar 400 connected between the main connectors 300 inside one battery container 1000 is also preferably located on the upper side in the inner space of the container housing 200. In particular, as described in the former aspect, the main bus bar 400 may be located on the upper side of the battery rack 100. In this case, by reducing the length of the main bus bar 400 and minimizing interference with the battery rack 100, the present disclosure may be advantageous to reduce costs or improve productivity when manufacturing the battery container 1000.

As indicated by R in FIG. 1, the container housing 200 may have a connector accommodation portion R. In particular, when a plurality of main connectors 300 are included in the battery container 1000, a plurality of connector accommodation portions R may also be formed. For example, as in the configuration shown in FIG. 1, when two main connectors 300 are located on the left and right sides of the battery container 1000, the connector accommodation portion R may include a first accommodation portion R1 formed on the left side of the container housing 200 and a second accommodation portion R2 formed on the right side of the container housing 200.

The connector accommodation portion R may be formed in a concave shape in an inner direction on at least one side of the container housing 200. Also, the main connector 300 may be located in the connector accommodation portion R of the container housing 200. In particular, although the connector accommodation portion R is a portion formed concave inward in the container housing 200, it may also be regarded as corresponding to the outer wall portion of the container housing 200. Therefore, although the main connector 300 is provided on the outer wall of the container housing 200, it may be regarded that the outer wall of the container housing 200 itself is formed concave inward. Therefore, it may be regarded that the main connector 300 is located in an inwardly concave portion of the outer wall of the container housing 200.

According to this aspect of the present disclosure, exposure of the main connector 300 may be minimized while exposing the main connector 300 to the outside so that connection members such as the link bus bar L1 may be easily connected to the main connector 300. Therefore, the present disclosure may be advantageous to protect the main connector 300 and the link bus bar L1 connected thereto while improving workability or installation convenience when connecting other connection members to the main connector 300. That is, since the main connector 300 is located in the concave portion, called the connector accommodation portion R, in the container housing 200, the external exposure of the main connector 300 is reduced so that the protection performance of the main connector 300 or the connection portion of the link bus bar L1 connected thereto is improved. Also, in this case, the main connector 300 may be easily protected by separately covering only the open portion of the concave portion.

In particular, the connector accommodation portion R may be located at the top edge portion of the container housing 200. For example, in the aspect of FIG. 8, the second accommodation portion R2 of the first container B-LINK #1 may be located at the top right edge portion of the container housing 200. Also, in the aspect of FIG. 8, the first accommodation portion R1 of the second container B-LINK #2 may be located at the top left edge portion of the container housing 200.

In particular, the connector accommodation portion R may be formed so that the main connector 300 is open in upper and side directions. Here, the side direction may be a direction in which another adjacent battery container 1000 is located. For example, in the aspect of FIG. 8, the second accommodation portion R2 of the first container B-LINK #1 may be configured to be open in the upper and right directions. Accordingly, the main connector 300 of the first container B-LINK #1 may be exposed in the upper and right directions. Also, the first accommodation portion R1 of the second container B-LINK #2 may be configured to be opened in the upper and left directions. Accordingly, the main connector 300 of the second container B-LINK #2 may be exposed in the upper and left directions.

According to this aspect of the present disclosure, a battery system may be constructed more easily. For example, as shown in FIG. 8, in a state where two battery containers 1000 are adjacently disposed in the left and right directions, each main connector 300 may be exposed in the upper and side directions of the adjacently disposed portion. Therefore, a worker may more easily install or replace the link bus bar L1 with respect to the main connector 300 exposed in this way.

Figure 9:
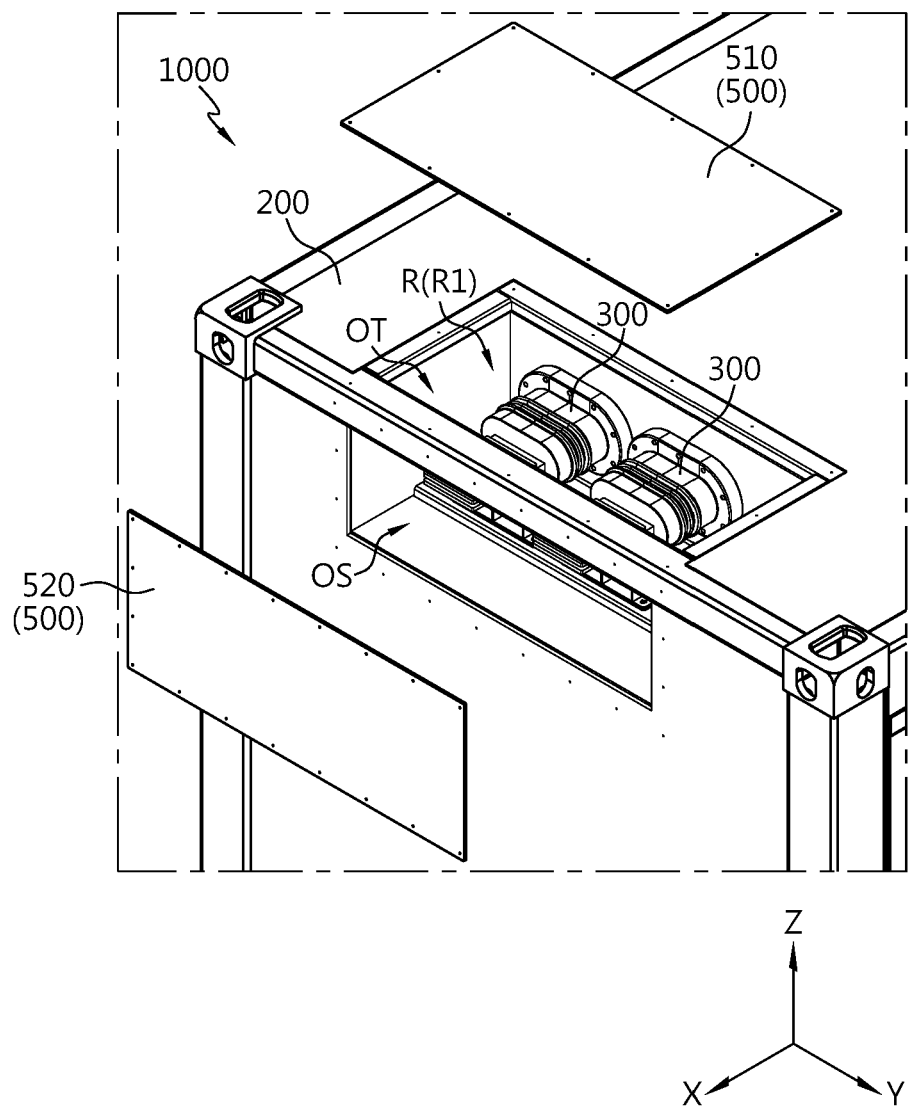
FIG. 9 is an exploded perspective view schematically showing some components of a battery container according to another aspect of the present disclosure.

FIG. 9 is an exploded perspective view schematically showing some components of a battery container 1000 according to another aspect of the present disclosure. In particular, FIG. 9 may be an enlarged view showing a left portion of the battery container 1000 according to the present disclosure. Also, FIG. 10 is a combined perspective view showing the configuration of FIG. 9.

Figure 10:
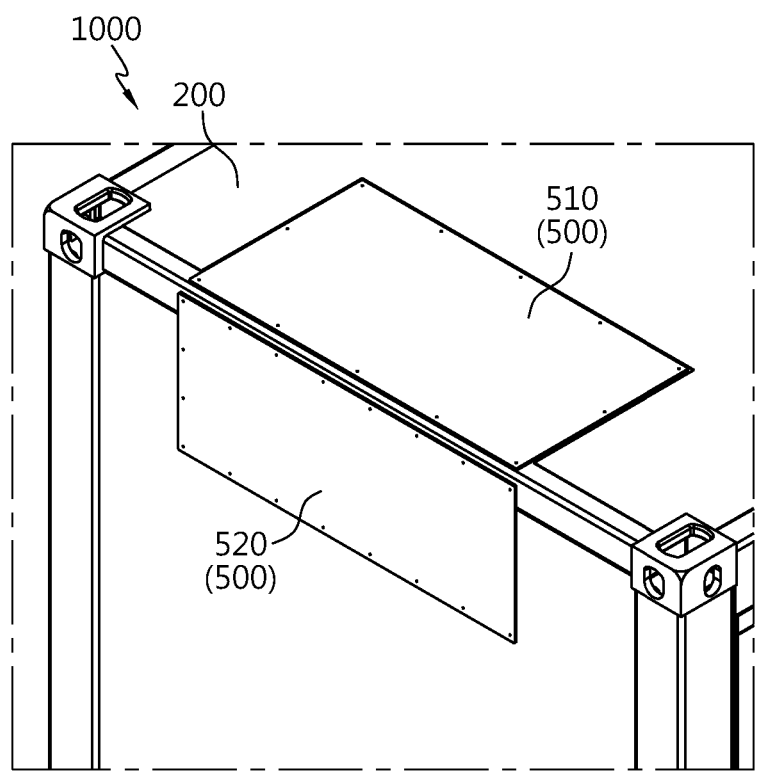
FIG. 10 is a combined perspective view showing the configuration of FIG. 9.

Referring to FIGS. 9 and 10, the battery container 1000 according to the present disclosure may further include a connector cover 500. The connector cover 500 may cover the outer side of the connector accommodation portion R. That is, the connector accommodation portion R may be provided in a form in which the outer wall of the container housing 200 is concave inward, and the connector cover 500 may be configured to cover the outer side of the concave portion. In particular, the connector cover 500 may be configured to cover the main connector 300 accommodated in the connector accommodation portion R.

Moreover, the connector cover 500 may be configured in an openable and closeable form to expose the connector accommodation portion R to the outside or prevent the exposure. For example, the connector cover 500 may completely close the connector accommodation portion R so that the main connector 300 is not exposed to the outside. Also, the connector cover 500 may expose the main connector 300 to the outside by opening at least a part of the connector accommodation portion R. At this time, when the main connector 300 is exposed to the outside, the link bus bar L1 or the link line L2 may be connected to the main connector 300 through the exposed portion.

The connector cover 500 may include at least one of an upper cover 510 and a side cover 520. The upper cover 510 may be configured to close or open an upper portion of the connector accommodation portion R. That is, the upper cover 510 may be configured to cover an upper open portion, as indicated by OT, among open portions of the first accommodation portion R1. Also, the side cover 520 may be configured to close an open side, as indicated by OS, among the open portions of the connector accommodation portion R. For example, as shown in FIGS. 9 and 10, the side cover 520 may be configured to cover a left open portion for first accommodation portion R1.

Moreover, the connector cover 500 may be configured to be at least partially detachable from the connector accommodation portion R of the container housing 200. For example, as shown in FIG. 9, the upper cover 510 and the side cover 520 may be configured to be completely separable from the connector accommodation portion R.

According to this aspect of the present disclosure, external exposure of the main connector 300 located outside the container housing 200 may be appropriately adjusted according to circumstances. Therefore, protection performance for the main connector 300 or a connection member connected thereto may be secured. For example, during transportation of the battery container 1000, as shown in FIG. 10, the upper cover 510 and the side cover 520 may close the open portion of the connector accommodation portion R, thereby preventing damage to the main connector 300 therein or electric shock accidents. Also, during installation of the battery container 1000, as shown in FIG. 9, the upper cover 510 and the side cover 520 may be separated from the connector accommodation portion R so that the connector accommodation portion R is opened. Therefore, a worker may easily connect a connection member such as the link bus bar L1 to the main connector 300 through the open portion.

Meanwhile, only a part of the connector cover 500 may be coupled to the connector accommodation portion R, so that a part of the connector accommodation portion R is opened and the other part is closed. For example, after the connection work of the battery container 1000 is completed, the upper cover 510 may be coupled to the connector accommodation portion R again to close the upper portion of the connector accommodation portion R as indicated by OT. In this case, the side of the connector accommodation portion R, as indicated by OS, is opened to provide a passage through which the link bus bar L1 may pass, while the upper portion may be closed to block rainwater, dust, and other foreign substances introduced from the upper side. Therefore, after the battery container 1000 is completely connected, the present disclosure may contribute to the protection of the main connector 300 and the link bus bar L1 and the prevention of an electric shock accident.

Figure 11:
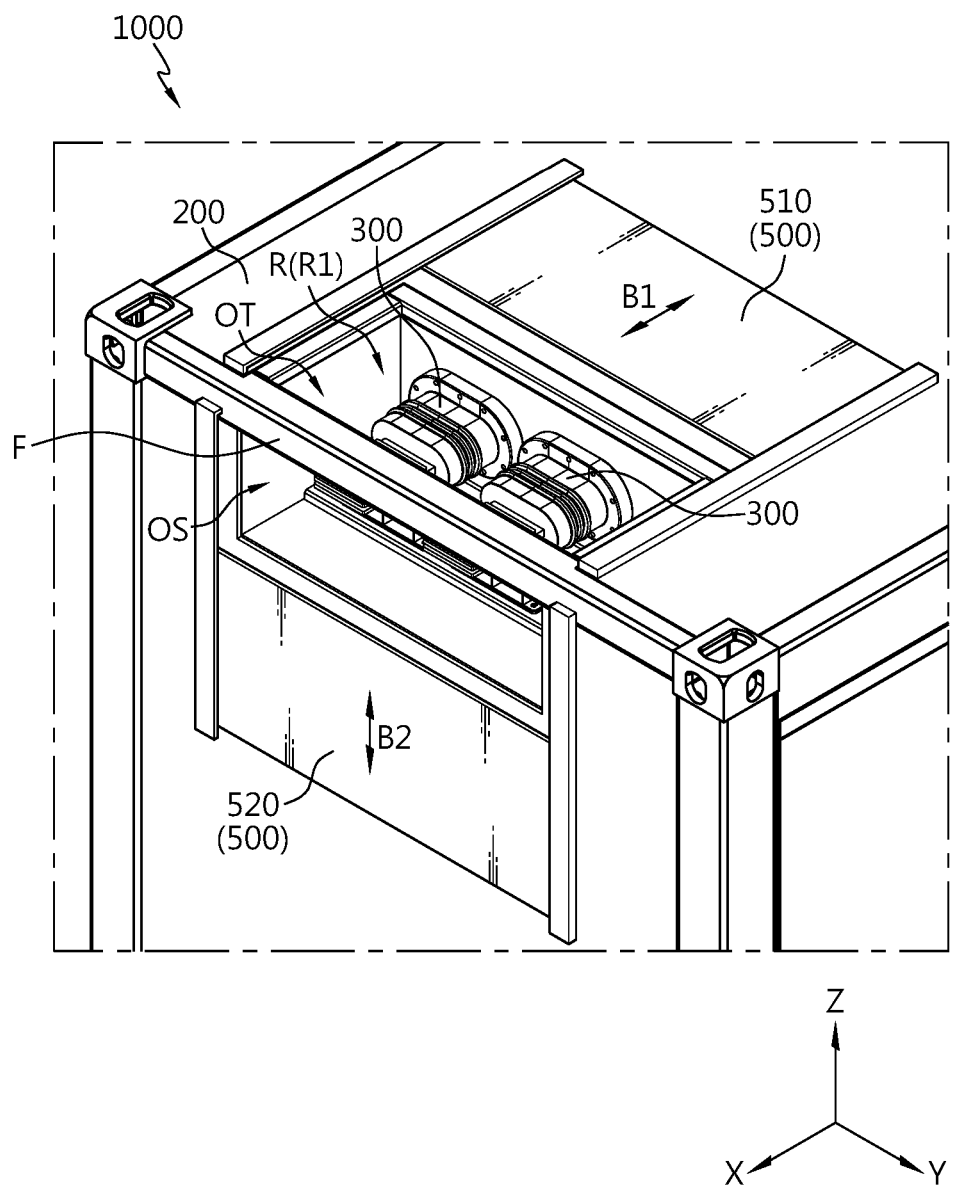
FIG. 11 is a diagram schematically showing some components of a battery container according to still another aspect of the present disclosure.

FIG. 11 is a diagram schematically showing some components of a battery container 1000 according to still another aspect of the present disclosure.

Referring to FIG. 11, the connector cover 500 may be configured to be slidable with respect to the container housing 200.

More specifically, the upper cover 510 may be configured to be mounted to the upper surface of the container housing 200, and as indicated by arrow B1 in FIG. 11, to be slidable in a horizontal direction (left and right direction). Also, the upper cover 510 may be configured to open and close the open top OT of the connector accommodation portion R due to such a sliding motion. For example, in the process of coupling the link bus bar L1 to the main connector 300, the upper cover 510 may slide in the −X-axis direction to open the upper portion of the connector accommodation portion R, thereby improving installation convenience of a worker for connecting the link bus bar L1. Also, when this connection work is completed, the upper cover 510 may slide in the +X-axis direction to close the connector accommodation portion R.

In addition, the side cover 520 may be configured to be mounted to the side surface of the container housing 200, and as indicated by arrow B2 in FIG. 11, to be slidable in vertical directions (upper and lower directions). In addition, the side cover 520 may be configured to open and close the open side OS of the connector accommodation portion R through such a sliding motion. For example, in the process of transporting the battery container 1000, the side cover 520 sliding upward may be maintained in this state to close the side of the connector accommodation portion R. Also, after the battery container 1000 is completely transported, the side cover 520 may slide downward to expose the side of the connector accommodation portion R, and a connection member such as the link bus bar L1 may be connected thereto.

Meanwhile, the container housing 200 may further include a coupling reinforcing portion, as indicated by F in FIG. 11. The coupling reinforcing portion F may be located in the connector accommodation portion R of the container housing 200. In particular, the coupling reinforcing portion F may be formed to be elongated along the edge of the container housing 200. Moreover, the coupling reinforcing portion F may be located at an edge portion where the connector accommodation portion R is formed, so that the open portion of the connector accommodation portion R is divided in an upper direction and a side direction.

The coupling reinforcing portion F may be provided so that components included in the battery container 1000 of the present disclosure or components required to construct an energy storage system using the battery container 1000 are fastened and fixed thereto. For example, the connector cover 500 described in the aspect shown in FIGS. 9 and 10 may be coupled and fixed to the coupling reinforcing portion F. More specifically, the coupling reinforcing portion F may have a fastening hole, a protrusion, a hook, or the like to which the upper cover 510 or the side cover 520 is fastened and fixed.

Figure 12:
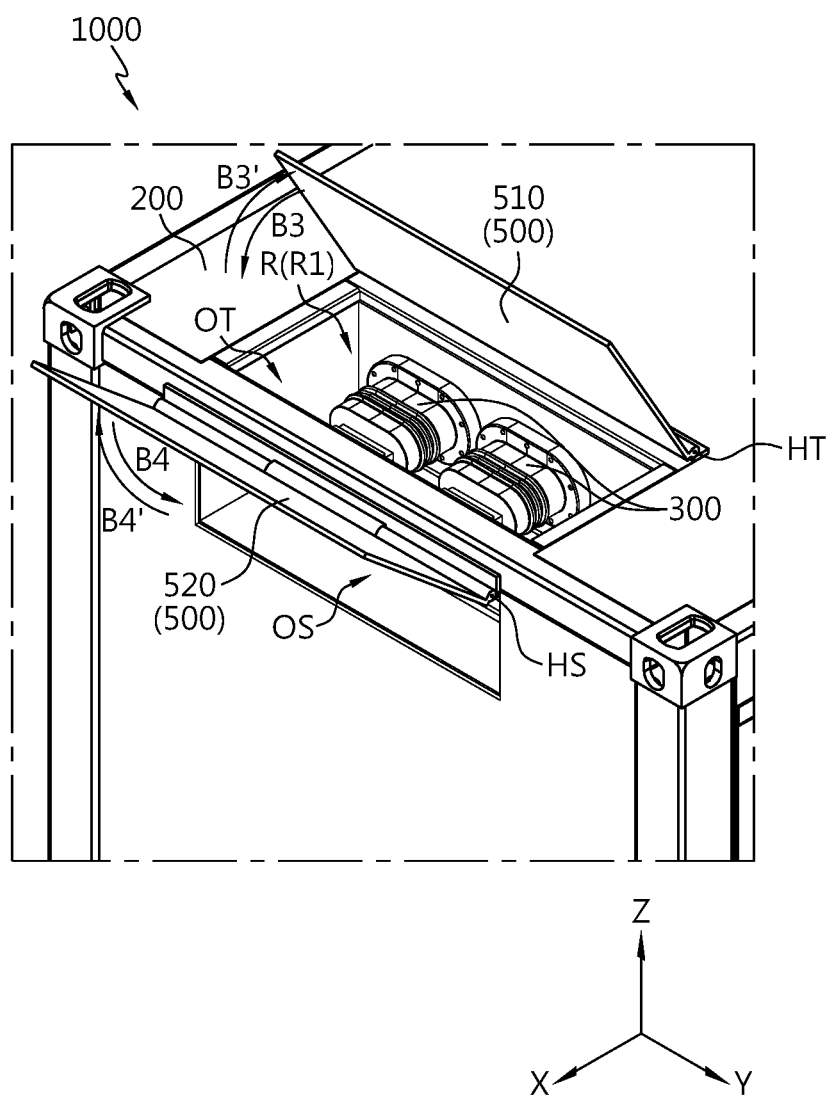
FIG. 12 is a diagram schematically showing some components of a battery container according to still another aspect of the present disclosure.

FIG. 12 is a diagram schematically showing some components of a battery container 1000 according to still another aspect of the present disclosure.

Referring to FIG. 12, the connector cover 500 may be configured to be hinge-pivotable with respect to the container housing 200.

More specifically, as indicated by HT, one end of the upper cover 510 may be hinged to the upper surface of the container housing 200 so as to be rotatable, as indicated by arrows B3 and B3'. Also, the upper cover 510 may be configured to open and close the open top OT of the connector accommodation portion R through such a rotation operation. For example, when the battery container 1000 is being transported, the upper cover 510 may rotate as indicated by B3, so that the open top OT of the connector accommodation portion R is maintained in a closed form. In addition, when the battery container 1000 is seated in a specific position to build an energy storage system, the upper cover 510 may be rotated as indicated by B3' to open the open top OT of the connector accommodation portion R. In this case, a worker may easily connect a connection member such as the link bus bar L1 to the main connector 300 through the open top of the connector accommodation portion R. Also, when the connection work for the main connector 300 is completed, the upper cover 510 may be rotated as indicated by B3 to close the open top OT of the connector accommodation portion R again.

In addition, as indicated by HS, the side cover 520 may be configured to have one end hinged to the side surface of the container housing 200 so as to be rotatable, as indicated by arrows B4 and B4'. In addition, the side cover 520 may be configured to open and close the open side OS of the connector accommodation portion R through this rotation operation. For example, when the battery container 1000 is being transported, the side cover 520 may rotate as indicated by B4 so that the open side OS of the connector accommodation portion R is maintained in a closed form. In addition, when the battery container 1000 is seated at a specific position to build an energy storage system, the side cover 520 may rotate as indicated by B4' to open the open side OS of the connector accommodation portion R. In this case, a worker may easily connect a connection member such as the link bus bar L1 to the main connector 300 through the open side OS of the connector accommodation portion R. Meanwhile, even after the connection work for the main connector 300 is completed, the side cover 520 may be maintained in an open state since the link bus bar L1 or the like needs to pass through the open side OS of the connector accommodation portion R.

According to this aspect of the present disclosure, the connector cover 500 may be easily opened and closed, and the connector cover 500 may be continuously coupled to the container housing 200 regardless of the opening and closing operation. Accordingly, the connector cover 500 may be more easily opened and closed, and the risk of loss of the connector cover 500 may be eliminated.

In this aspect, the side cover 520 may have a hinge coupling portion HS located on the top. In this case, the open side OS of the connector accommodation portion R may be opened as the bottom of the side cover 520 rotates upward. In this aspect, the side cover 520 may be configured to protect the outer side of the connection member connected to the main connector 300. This will be described in more detail with reference to FIGS. 13 and 14.

Figure 13:
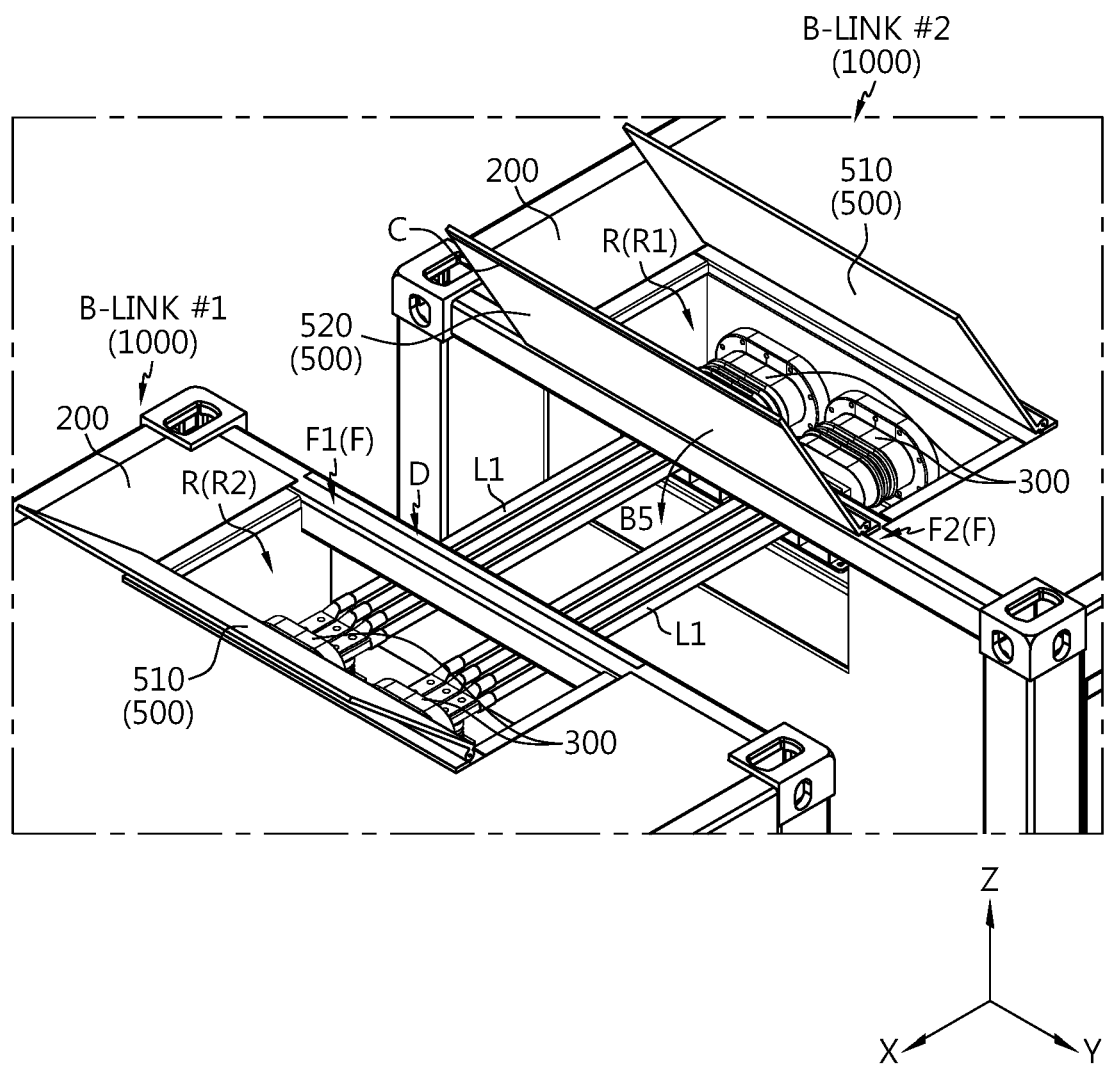
FIGS. 13 and 14 are diagrams schematically showing the configuration in which battery containers according to still another aspect of the present disclosure are connected to each other.
Figure 14:
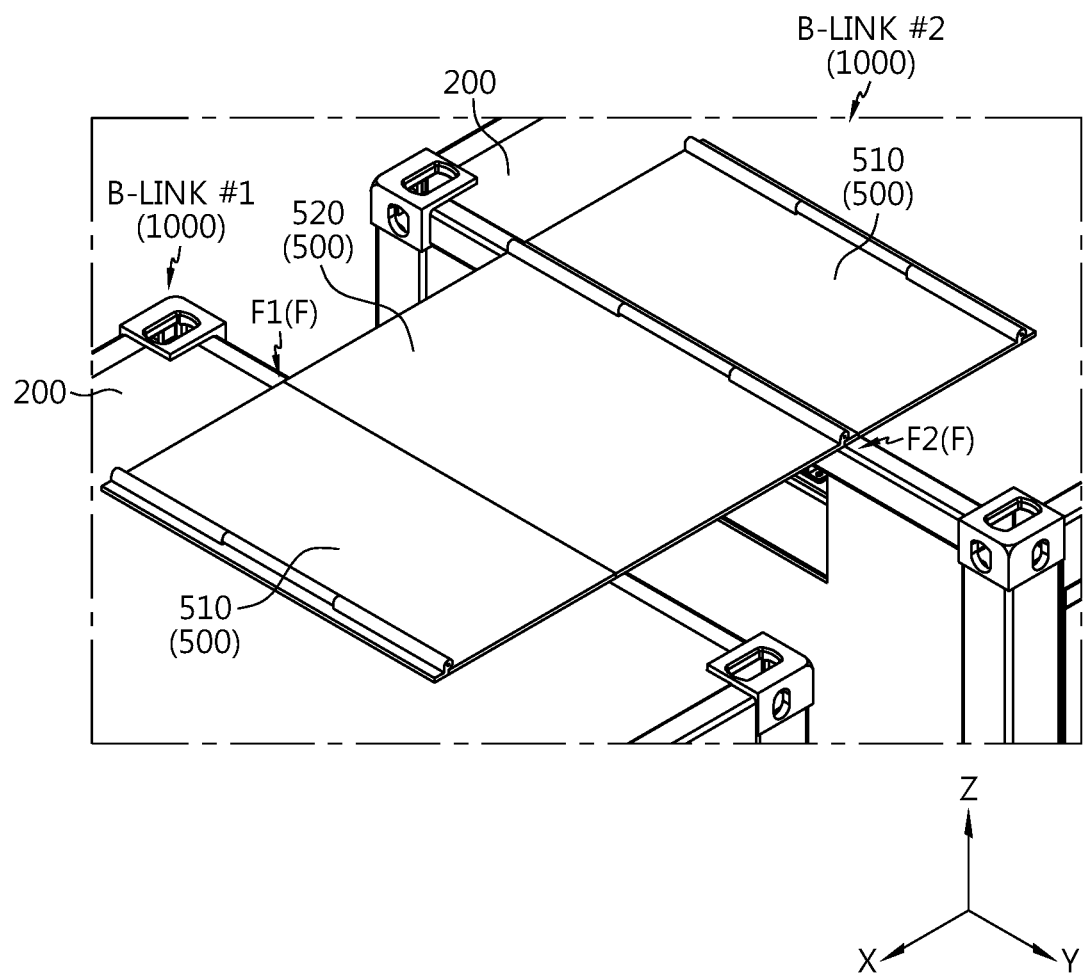

FIGS. 13 and 14 are diagrams schematically showing the configuration in which battery containers 1000 according to still another aspect of the present disclosure are connected to each other. In FIGS. 13 and 14, a right portion of the first container B-LINK #1 and a left portion of the second container B-LINK #2 are shown. In this case, the left portion of the first container B-LINK #1, not shown in the drawing, may be configured in the same form as the left portion of the second container B-LINK #2 shown in the drawing. Also, the right portion of the second container B-LINK #2, not shown in the drawing, may be configured in the same form as the right portion of the first container B-LINK #1 shown in the drawing. That is, the first container B-LINK #1 and the second container B-LINK #2 may be configured in the same form as each other as battery containers according to an aspect of the present disclosure.

First, referring to FIG. 13, the main connector 300 provided on the right side of the first container B-LINK #1 and the main connector 300 provided on the left side of the second container B-LINK #2 may be connected to each other through the link bus bar L1. At this time, in the case of the connector accommodation portion R, namely the first accommodation portion R1 provided on the left side of the second container B-LINK #2, as described in the aspect of FIG. 12, the upper cover 510 and the side cover 520 may be configured to be hinge-pivotable. Accordingly, in a state where the upper cover 510 and the side cover 520 are open, a worker may connect the link bus bar L1 to the main connector 300 of the first container B-LINK #1 and the main connector 300 of the second container B-LINK #2.

And, when such a connection work is completed, as shown in FIG. 14, the upper portion of the connector accommodation portion R of each container may be closed by closing the upper cover 510 provided to the first container B-LINK #1 and the upper cover 510 provided to the second container B-LINK #2.

Therefore, after the battery container 1000 is installed, external foreign substances are prevented from being introduced into the open top OT of the connector accommodation portion R, and electric shock accidents may be prevented reliably by suppressing external exposure of electrical connection parts such as the main connector 300.

Moreover, as shown in FIGS. 13 and 14, the hinge coupling portion HS of the side cover 520 of the second container B-LINK #2 may be located on the upper surface of the coupling reinforcing portion F. In this case, in a state where the side cover 520 of the second container B-LINK #2 is seated on the coupling reinforcing portion F of the first container B-LINK #1, the side cover 520 may be maintained parallel to the ground. Accordingly, it is possible to suppress rainwater or the like from being directed toward the main connector 300 located on the left or right side.

Also, in this aspect, at least one connector cover 500 among the two battery containers 1000 connected to each other may be configured to protrude outward in a horizontal direction.

For example, after the link bus bar L1 is completely connected, the side cover 520 of the second container B-LINK #2 may be configured to rotate as indicated by arrow B5 to protrude in the horizontal direction toward the first container B-LINK #1. In this case, the side cover 520 of the second container B-LINK #2 may be configured to cover the space between the second container B-LINK #2 and the first container B-LINK #1. Moreover, the side cover 520 of the second container B-LINK #2 may be configured to cover the space between the second container B-LINK #2 and the first container B-LINK #1 from the above.

According to this aspect, the upper portion of the link bus bar L1 disposed in the space between the second container B-LINK #2 and the first container B-LINK #1 may be covered. Accordingly, it is possible to improve the protection effect for the link bus bar L1 or the main connector 300. For example, it is possible to suppress snow, rain, dust, or other foreign matter from being introduced to the link bus bar L1 or the main connector 300 at the upper portion of the link bus bar L1.

In this aspect, the connector cover 500 configured to protrude outward in the horizontal direction may be configured to be seated in another battery container 1000. For example, as shown in FIG. 14, in a state where one end of the side cover 520 of the second container B-LINK #2 is hinged to the second reinforcing portion F2, which is the coupling reinforcing portion F of the second container B-LINK #2, the other end may be seated on the first reinforcing portion F1, which is the coupling reinforcing portion F of the first container B-LINK #1.

At this time, a seating portion may be formed in the first reinforcing portion F1 of the first container B-LINK #1 so that the side cover 520 of the second container B-LINK #2 may be seated as indicated by D in FIG. 13. In particular, the seating portion D may be formed in the form of a downwardly concave groove in the coupling reinforcing portion F. When the link bus bar L1 is connected between the main connectors 300 of two battery containers 1000, the end of the side cover 520 may be seated on the seating portion D. In addition, the seating portion D may be configured to have various other fastening shapes such as projections or hooks.

According to this aspect of the present disclosure, the side cover 520 may be stably coupled to another container. Accordingly, the assembly between battery containers may be improved. Also, in this case, the link bus bar L1 or the main connector 300 may be more reliably protected by the side cover 520.

In addition, the side cover 520 may include a sealing member at an end seated on the seating portion D, as indicated by C in FIG. 13. The sealing member C may be made of an elastic material such as rubber, silicone, or polyurethane. In this case, when the side cover 520 is seated on the seating portion D, it is possible to prevent impact from being applied to the side cover 520 or the coupling reinforcing portion F of the container housing 300. Accordingly, damage or breakage of the side cover 520 or the coupling reinforcing portion F may be prevented. In addition, in this case, the sealing force between the side cover 520 and the coupling reinforcing portion F is improved, so that the effect of preventing the introduction of foreign substances such as water or dust may be further improved.

Meanwhile, in the aspect of FIG. 12, it is illustrated that the bottom of the side cover 520 rotates upward to open the open side of the connector accommodation portion R, but the side cover 520 may also be configured to have a hinge coupling portion on the bottom so that the top thereof rotates downward to open the open side of the connector accommodation portion R. For example, in the aspect of FIGS. 13 and 14, the bottom of the side cover 520 provided to the connector accommodation portion R formed on the right side of the first container B-LINK #1 may be hinged, so that the top thereof rotates downward to open the open side of the connector accommodation portion R. In this case, it may be regarded that the two side covers 520 facing each other, namely the side cover 520 of the first container B-LINK #1 and the side cover 520 of the second container B-LINK #2, are configured to be opened in opposite directions.

According to this aspect, in a state where the open side of the connector accommodation portion R is open, mutual interference of the side covers 520 may be avoided. For example, as shown in FIGS. 13 and 14, the left side cover 520 covering the left portion of the first accommodation portion R1 of the second container B-LINK #2 may be maintained to be opened in the form of being located above the link bus bar L1. In addition, the right side cover 520 covering the right portion of the second accommodation portion R2 of the first container B-LINK #1 may rotate downward and adhere to the right outer wall of the first container B-LINK #1, thereby causing the right portion of the second accommodation portion R2 to be opened.

According to this aspect, in a situation where the battery container 1000 is being transported or completely installed, it is possible to prevent external foreign substances from being input into the electrical connection configuration such as the main connector 300 or the link bus bar L1, and electric shock accidents or the like may also be prevented. In addition, during installation of the battery container 1000, a connection work between the main connector 300 and the link bus bar L1 may be easily performed.

Figure 15:
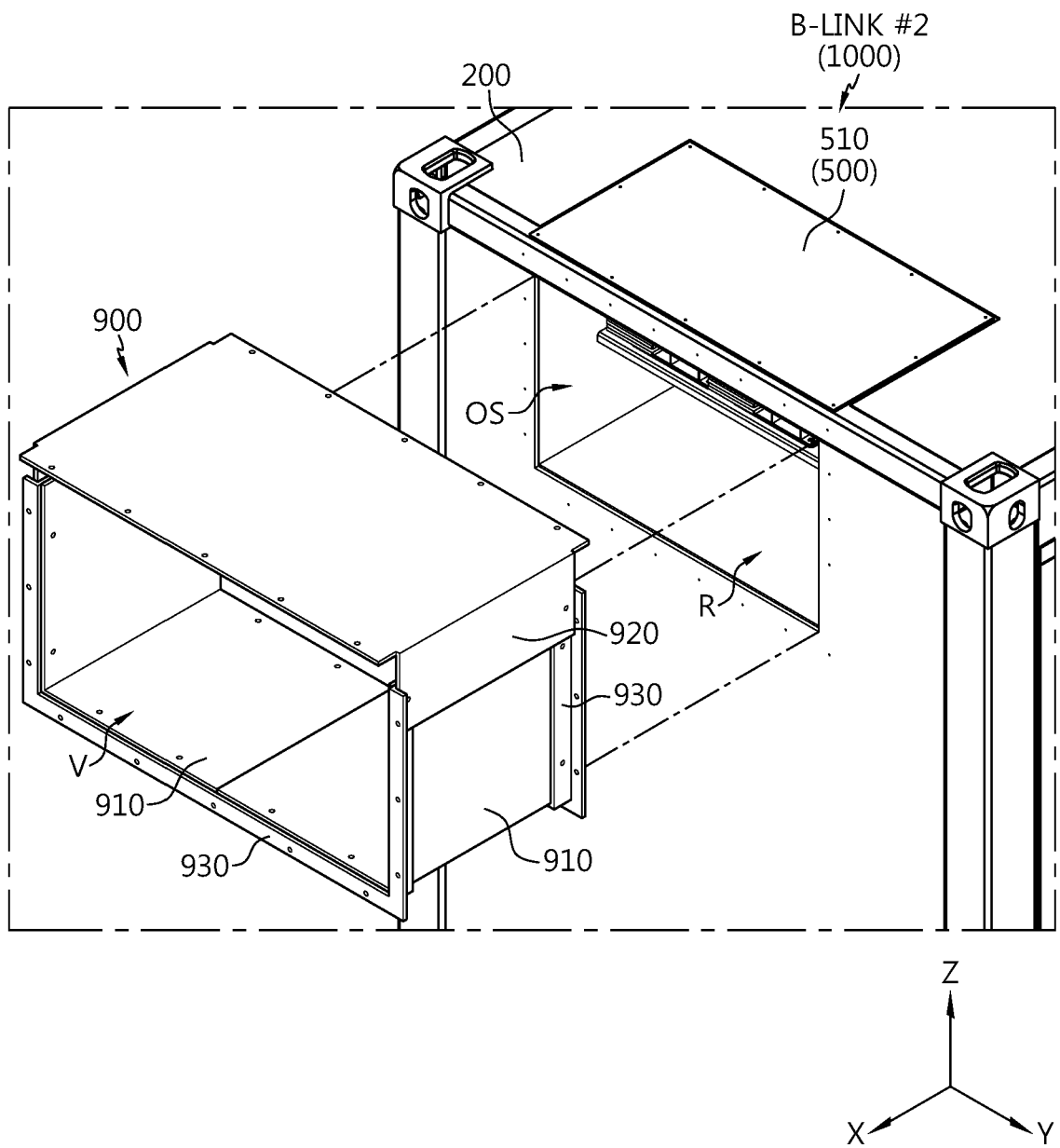
FIG. 15 is an exploded perspective view schematically showing a portion of the battery container according to still another aspect of the present disclosure.
Figure 16:
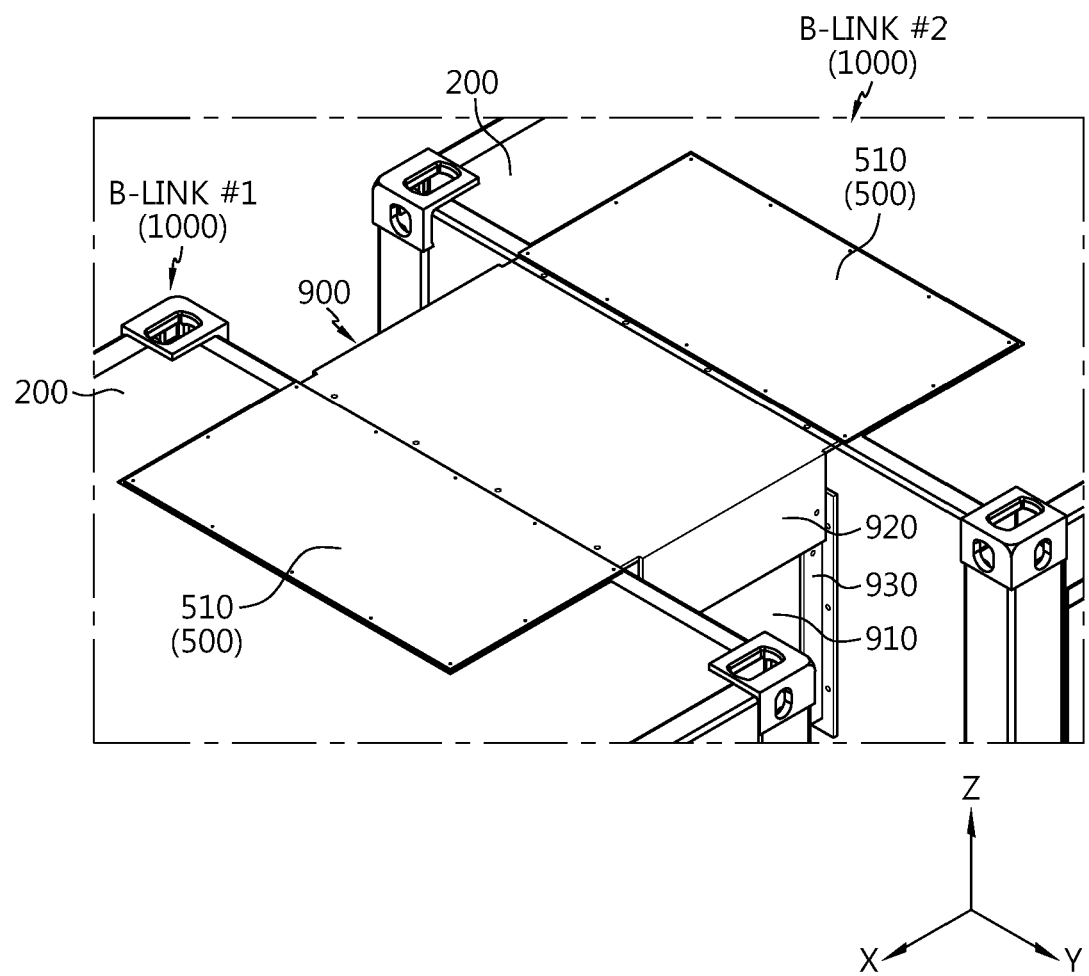
FIG. 16 is a partial perspective view schematically showing the configuration in which another battery container is coupled to the battery container of FIG. 15.
Figure 17:
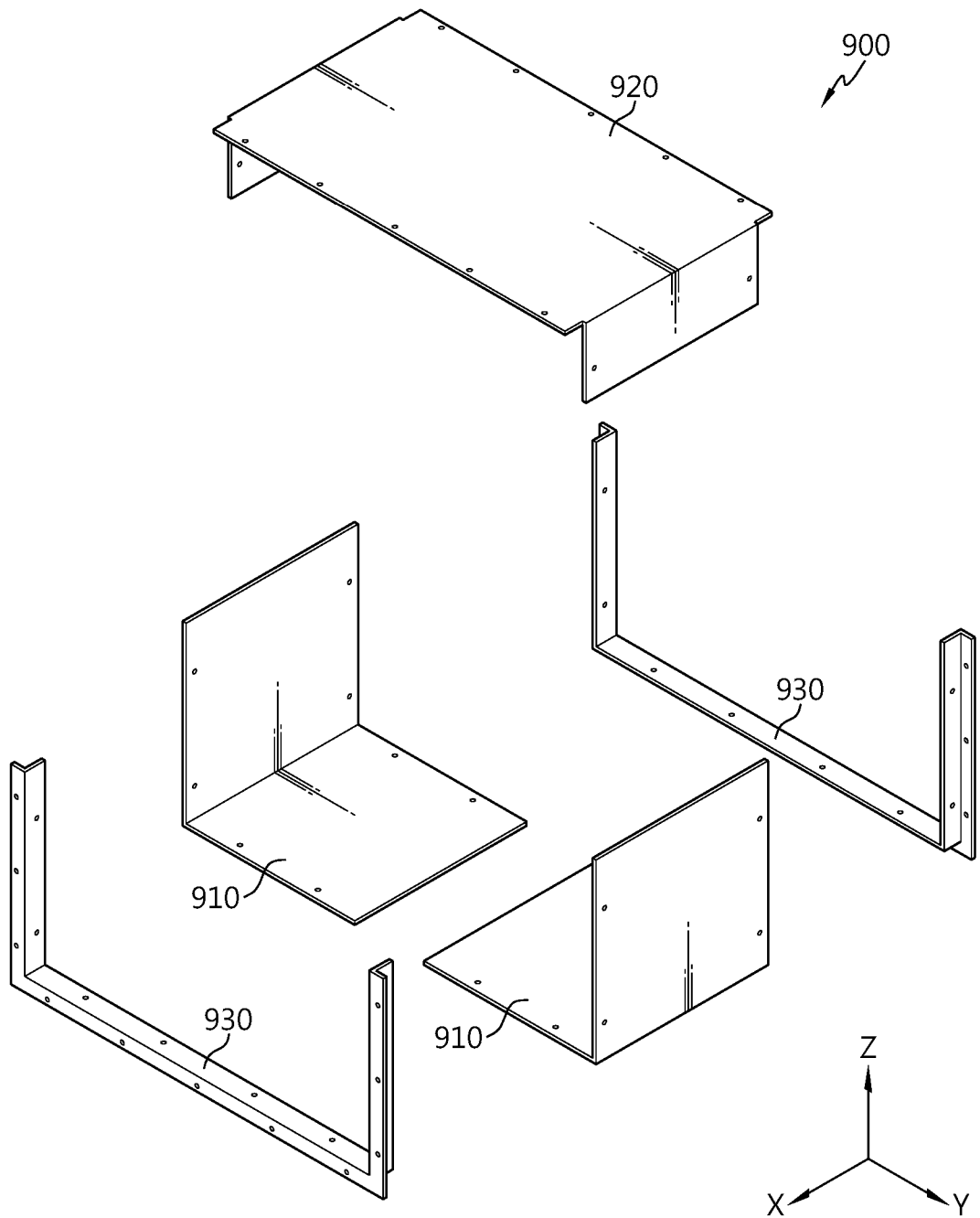
FIG. 17 is a perspective view showing some components of the battery container shown in FIG. 15 separately.

FIG. 15 is an exploded perspective view schematically showing a portion of the battery container 1000 according to still another aspect of the present disclosure. FIG. 16 is a partial perspective view schematically showing the configuration in which another battery container 1000 is coupled to the battery container 1000 of FIG. 15. FIG. 17 is a perspective view showing some components of the battery container 1000 shown in FIG. 15 separately.

Referring to FIGS. 15 to 17, the battery container 1000 according to the present disclosure may further include a link cover 900.

The link cover 900 may be configured to be coupled to the outer wall of the container housing 200, particularly to the side of the connector accommodation portion R. For example, as shown in FIG. 15, the link cover 900 may be coupled to the connector accommodation portion R formed on the left side of the second container B-LINK #2. In particular, an empty space, namely a hollow, may be formed in the center of the link cover 900, as indicated by V. Also, the link cover 900 may be attached to the container housing 200 such that the hollow V communicates with the open side OS of the connector accommodation portion R.

The link cover 900 may be configured to be detachable from the outer wall of the container housing 200. In particular, when the battery container 1000 is being stored or transported, the side cover 520 may be attached to the open side OS of the connector accommodation portion R. Also, in order for the battery container 1000 to be connected to another battery container 1000 or control container 2000, the side cover 520 opens the open side OS, and the link cover 900 may be coupled to the sidewall of the container housing 200 so that the hollow V communicates with the open side OS.

The link cover 900 may be configured such that one end is coupled to the container housing 200 of the battery container 1000 included therein. In addition, the link cover 900 may be configured such that the other end may be coupled to the container housing 200 of another battery container 1000. For example, in the aspect of FIG. 15, the link cover 900 is a component included in the second container B-LINK #2, and may be configured such that its right end may be coupled to the left wall of the container housing 200 of the second container B-LINK #2. In addition, in the aspect of FIG. 15, the left end of the link cover 900 may be configured to be coupled to the right wall of the container housing 200 of another battery container 1000, for example the first container B-LINK #1 as in the aspect of FIG. 16. Here, the link cover 900 may be coupled to the container housing 200 using various fastening methods such as bolting and hooking.

In addition, the link cover 900 may be coupled to surround the periphery of the connector accommodation portion R, particularly the open side OS of the connector accommodation portion R, in the container housing 200. For example, an end of the link cover 900 is formed in a substantially square ring shape, and may be coupled to an upper portion, a lower portion, a front portion, and a rear portion, respectively, with respect to the open side OS of the connector accommodation portion R.

In addition, the link cover 900 may be configured to surround the link bus bar L1 connected to the main connector 300 in a state of being coupled to the side of the connector accommodation portion R. For example, as shown in FIG. 15, in a state where the right end of the link cover 900 is coupled to the open side OS of the left connector accommodation portion R of the second container B-LINK #2, the left end of the link cover 900 may be coupled to the open side of the right connector accommodation portion R of the first container B-LINK #1 as shown in FIG. 16. At this time, the link bus bar L1 may be connected between the main connector 300 located in the left connector accommodation portion R of the second container B-LINK #2 and the main connector 300 located in the right connector accommodation portion R of the first container B-LINK #1. In particular, a hollow V is formed in the link cover 900, and the link bus bar L1 may be inserted into the hollow V.

The link cover 900 may be configured to cover a direction orthogonal to the extension direction of the link bus bar L1.

For example, the link bus bar L1 extends in the left and right direction between two battery containers 1000 arranged in the left and right direction, and the link cover 900 may be configured to surround the upper portion, the lower portion, the front portion and the rear portion of the bus bar L1 in a state where both ends are coupled to the two battery containers 1000.

Referring to FIG. 17, the link cover 900 may include a plurality of unit covers. At this time, the plurality of unit covers may be configured to be separated from and coupled with each other. In particular, in the link cover 900, the unit covers may be manufactured to be separated from each other, and the unit covers may be coupled to each other in the process of being mounted to the container housing 200. In this case, the plurality of unit covers may be coupled in a manner such as bolting. To this end, a fastening hole for mutual bolting may be formed in at least some of the plurality of unit covers. In addition, the plurality of unit covers may have a configuration such as a protrusion or a groove for mutual insertion fastening or the like.

According to this aspect of the present disclosure, since the link cover 900 is divided into several unit covers, the link cover 900 may be handled and mounted more easily. Also, according to this aspect, overall protection may be better achieved for the link bus bar L1.

Moreover, the link cover 900 according to the present disclosure may include a bottom cover 910 and a top cover 920 as shown in FIG. 17 as the plurality of unit covers.

Here, the bottom cover 910 may be configured to protect the lower portion and the side portion of the link bus bar L1. To this end, the bottom cover 910 may have several plate-shaped portions in order to easily form a space for accommodating the link bus bar L1 therein and increase coupling. More specifically, the bottom cover 910 may include a lower plate for covering the lower portion of the link bus bar L1 and a side plate for covering the side portion of the link bus bar L1. Moreover, the bottom cover 910 may be configured in the form of a bent plate.

In addition, the top cover 920 may be configured to protect the upper portion of the link bus bar L1. To this end, the top cover 920 may include a plate-shaped portion, namely an upper plate, to cover the upper portion of the link bus bar L1. In particular, the top cover 920 may be configured to be longer than the space between the two battery containers, so that a part thereof may be seated on the upper portion of two battery containers. For example, in the aspect of FIG. 16, the left end of the top cover 920 may be seated on the right upper surface of the container housing 200 of the first container B-LINK #1, and the right end of the top cover 920 may be seated on the left upper surface of the container housing 200 of the second container B-LINK #2.

According to this aspect of the present disclosure, the exposed portion of the link bus bar L1 between two battery containers 1000 may be easily covered. In particular, upper, lower, front, and rear surfaces of the link bus bar L1 connected between two battery containers 1000 disposed in the left and right directions may be exposed in the space between the two battery containers 1000. However, in this aspect, by the bottom cover 910 and the top cover 920, the exposed portions of the link bus bar L1, namely the upper portion, the lower portion, the front portion, and the rear portion may be covered and protected. In addition, according to this aspect, since the bottom cover 910 and the top cover 920 may be fastened in a state where the link bus bar L1 is connected between the two battery containers 1000, the link bus bar L1 and the link cover 900 may be easily assembled.

In addition, the plurality of unit covers constituting the link cover 900 may further include a guide cover 930 as shown in FIG. 17. The guide cover 930 may be coupled to the outer side of the container housing 200. Here, the guide cover 930 may be bolted to the container housing 200. At this time, a coupling hole for bolting may be formed in the guide cover 930 and the container housing 200, respectively.

In addition, as shown in FIG. 17, the guide cover 930 may be configured in an approximate C shape and coupled to the lower portion and the side portion (front portion, rear portion) of the connector accommodation portion R in the container housing 200. More specifically, the guide cover 930 may include a horizontal guide portion and a vertical guide portion. Here, the horizontal guide portion may be positioned at the lower side of the open side OS of the connector accommodation portion R in the container housing 200, and the vertical guide portion may be positioned at the front and rear sides of the open side OS of the connector accommodation portion R.

Since the link cover 900 positioned between the two battery containers 1000 may be coupled to the two battery containers 1000, respectively, two guide covers 930 may be included. For example, seeing the configuration shown in FIG. 17, as a unit cover for constituting one link cover 900, two guide covers 930 may be included. At this time, one guide cover 930 may be coupled to the right surface of the first container B-LINK #1, and the other guide cover 930 may be coupled to the left surface of the second container B-LINK #2.

The guide cover 930 may be configured such that at least one of the bottom cover 910 and the top cover 920 is seated. That is, the guide cover 930 may be configured such that the bottom cover 910 or the top cover 920 is seated in a state of being coupled to the outer side of the container housing 200. Seeing the configuration shown in FIGS. 15 to 17 as a more specific aspect, the bottom cover 910 may be seated on two guide covers 930. In particular, the left portion of the bottom cover 910 may be seated on the left guide cover 930, and the right portion of the bottom cover 910 may be seated on the right guide cover 930.

Figure 18:
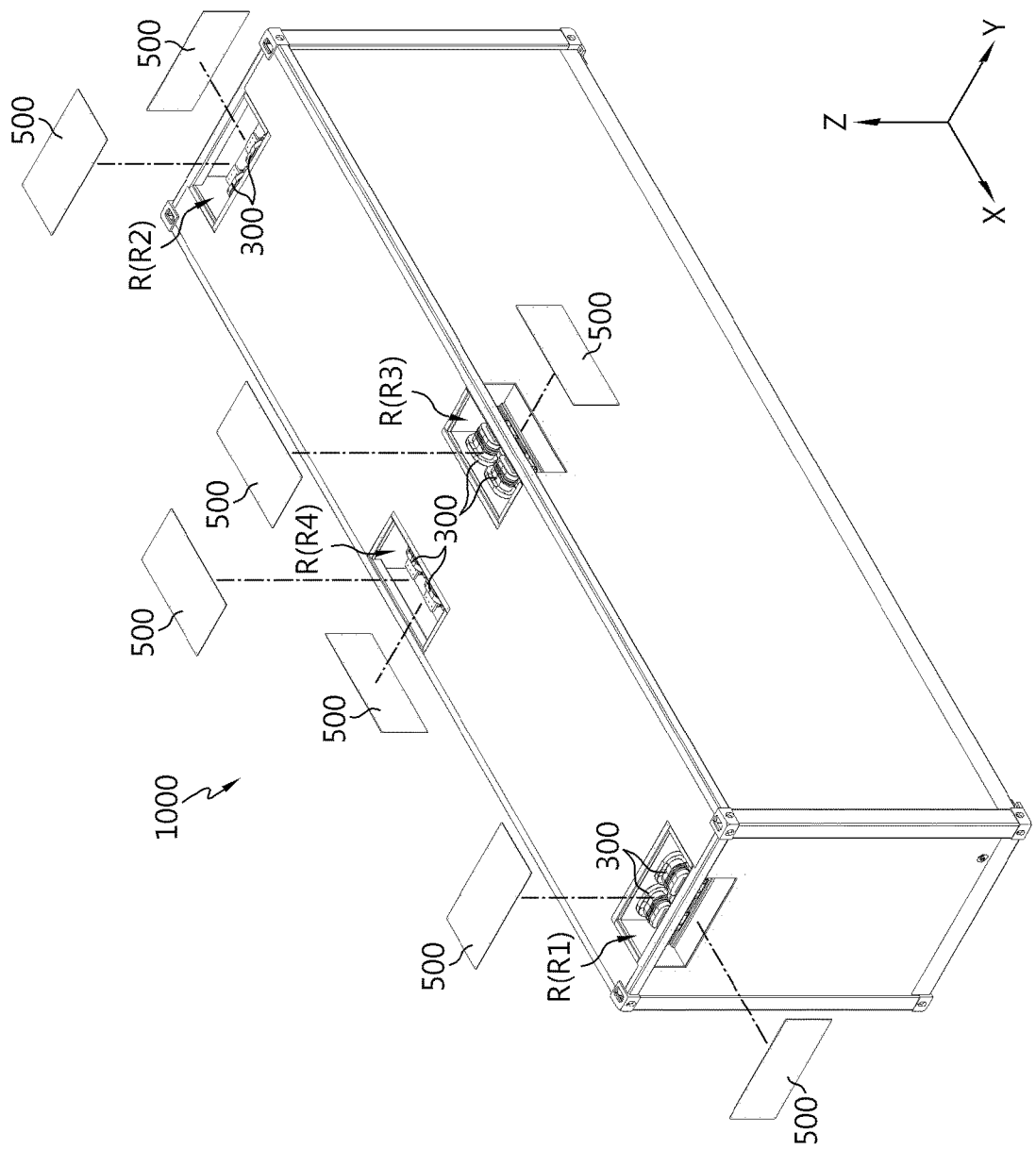
FIG. 18 is a perspective view schematically showing the configuration of a battery container according to still another aspect of the present disclosure.

FIG. 18 is a perspective view schematically showing the configuration of a battery container 1000 according to still another aspect of the present disclosure.

Referring to FIG. 18, three or more connector accommodation portions R may be formed in the battery container 1000. More specifically, the connector accommodation portions R are formed on the upper side of the container housing 200, and may be formed not only on the left and right sides, but also on the front and rear sides, respectively. In addition, the main connector 300 may be provided in each of these four connector accommodation portions R1 to R4. In addition, the main connectors 300 may be connected to each other through the main bus bar 400 so that a power, particularly a DC power, flows. In addition, in each of the connector accommodation portions R1 to R4, the connector cover 500 may be provided to be opened and closed in order to expose or cover the main connector 300.

According to this aspect, various types of energy storage systems may be easily implemented. For example, two different battery containers 1000 may be arranged side by side in the left and right longitudinal directions and connected to each other in the form of a DC link, as shown in FIGS. 4 and 5. Alternatively, two different battery containers 1000 may be arranged side by side in the front and rear width directions and connected to each other in the form of a DC link. Here, when two battery containers 1000 are arranged side by side in the left and right longitudinal directions, the main connectors 300 of the connector accommodation portions R1 and R2 located at both left and right ends may be used. Alternatively, when two battery containers 1000 are arranged side by side in the front and rear width directions, the main connectors 300 of the connector accommodation portions R3 and R4 located at both front and rear ends may be used. Therefore, the degree of freedom may increase with respect to the overall design form of the energy storage system or the arrangement position of the battery container 1000.

Meanwhile, in this aspect, both the upper and side portions of the connector accommodation portion R where the unused main connector 300 is located may be covered by the connector cover 500 according to the arrangement state of the battery container 1000.

Figure 19:
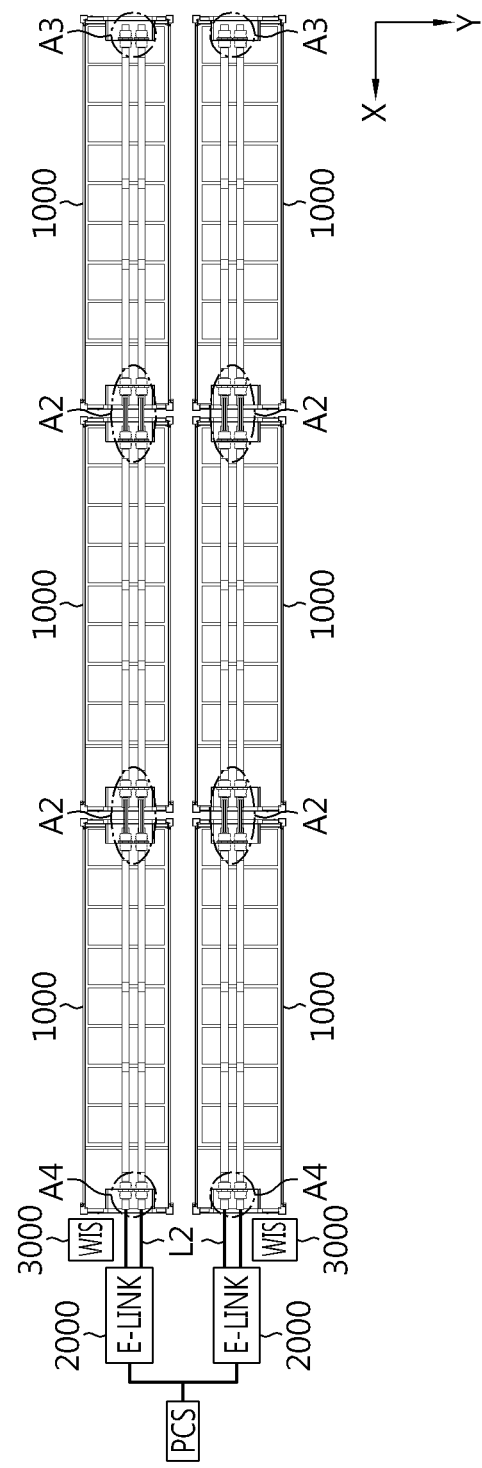
FIG. 19 is a diagram schematically showing the configuration of an energy storage system constructed using a plurality of battery containers according to an aspect of the present disclosure.

FIG. 19 is a diagram schematically showing the configuration of an energy storage system constructed using a plurality of battery containers 1000 according to an aspect of the present disclosure. Moreover, FIG. 19 may be regarded as a diagram schematically showing the configuration of an energy storage system according to an aspect of the present disclosure.

Referring to FIG. 19, the energy storage system according to the present disclosure may include the battery container 1000 according to the present disclosure, a control container 2000, and a PCS. For example, the energy storage system may include six battery containers 1000, two control containers 2000 E-LINK, and one PCS.

Here, three battery containers 1000 and one control container 2000 may constitute one link group. In addition, the energy storage system of FIG. 19 includes two link groups. Also, two link groups may be connected to one PCS. In each link group, charging and discharging power paths, namely DC paths, of three battery containers 1000 may be connected to each other through the main connectors 300 thereof located at both left and right ends. In this case, the link bus bar L1 is connected between the battery containers 1000, as in the portion indicated by A2, as shown in FIGS. 6 to 8, so that a DC link between the battery containers 1000 may be implemented. Also, for the connection of the link bus bar L1, the side cover 520 may open the open side OS of the connector accommodation portion R in the portion indicated by A2.

Meanwhile, in each of the two link groups, in a portion of the battery container 1000 located outside, to which other containers are not connected, the side cover 520 may have a form in which the open side OS of the connector accommodation portion R is closed. For example, in the aspect of FIG. 19, in the right connector accommodation portion R of the battery container 1000 located at the rightmost side, as indicated by A3, the open side OS may be configured in a closed form by the side cover 520.

In addition, in each of the two link groups, the battery container 1000 located closest to the PCS in terms of electrical path, for example the battery container 1000 located on the leftmost side, among the battery containers 1000 located on the outside may be connected to the control container 2000. In this case, the control container 2000 E-LINK may be a component configured to perform overall control or diagnosis of three battery containers 1000 B-LINK connected at the rear end. That is, in this aspect, a control component for integrally controlling the plurality of battery container 1000 B-LINKs may separately exist outside each battery container 1000 B-LINK. The control container 2000 E-LINK may include a DC part, an AC part, a BSC part, and the like in order to control the plurality of battery containers 1000. In each link group, the control component for the plurality of battery containers 1000 may be integrated into the control container 2000. Accordingly, the control component included in each battery container 1000 may be deleted or reduced, so the configuration of the battery container 1000 may be simplified. Meanwhile, each control container 2000 E-LINK may be connected to the PCS.

In the aspect of FIG. 19, the battery container 1000 may be connected to the control container 2000 through a link line indicated by L2. The link line L2 connected to the control container 2000 may be connected to the main connector of the battery container 1000. In this case, the battery container 1000 may further include an additional component for connection with the link line L2. This will be described in more detail with further reference to FIGS. 20 and 21.

Figure 20:
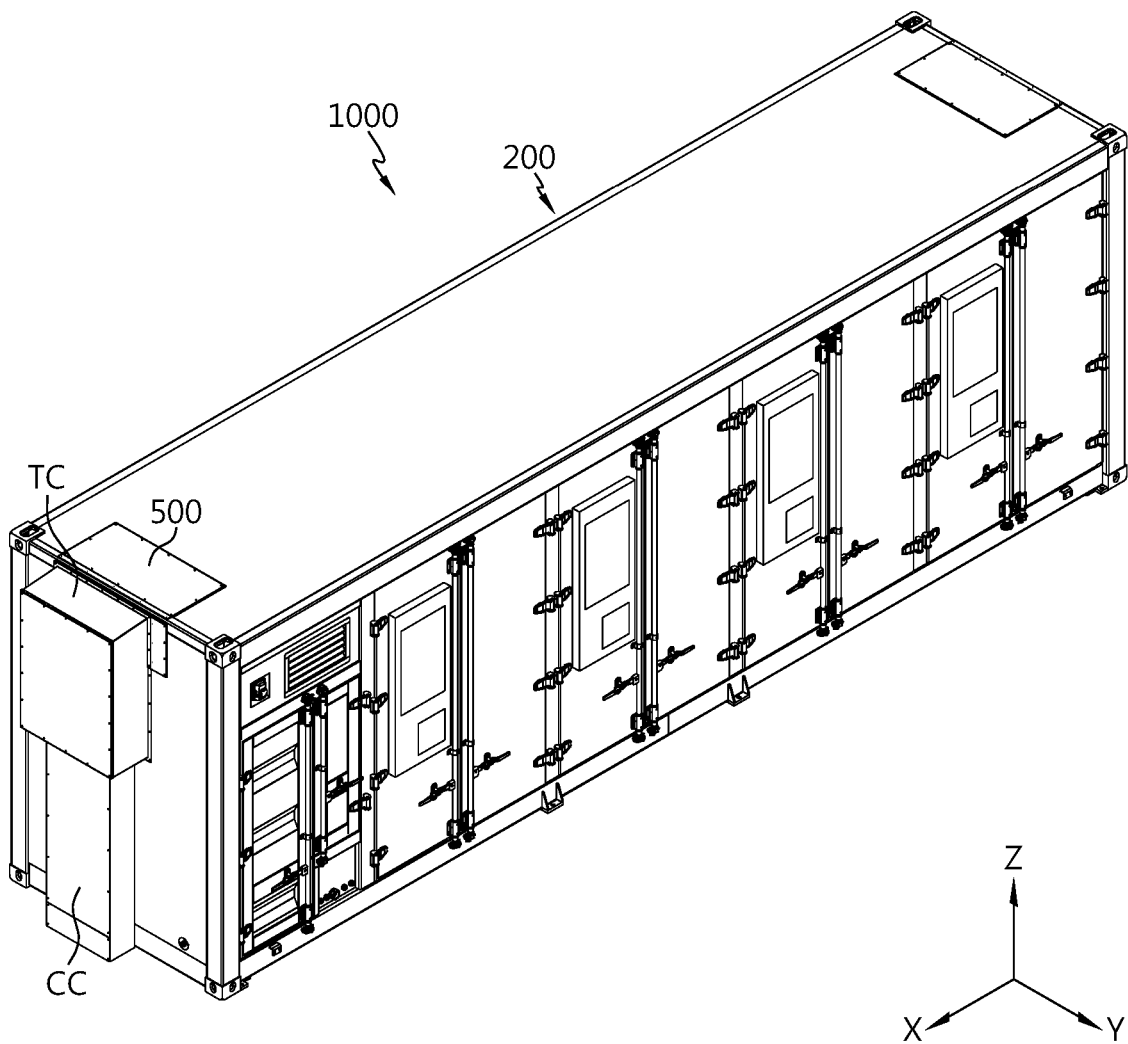
FIG. 20 is a perspective view schematically showing the configuration of a battery container according to still another aspect of the present disclosure.
Figure 21:
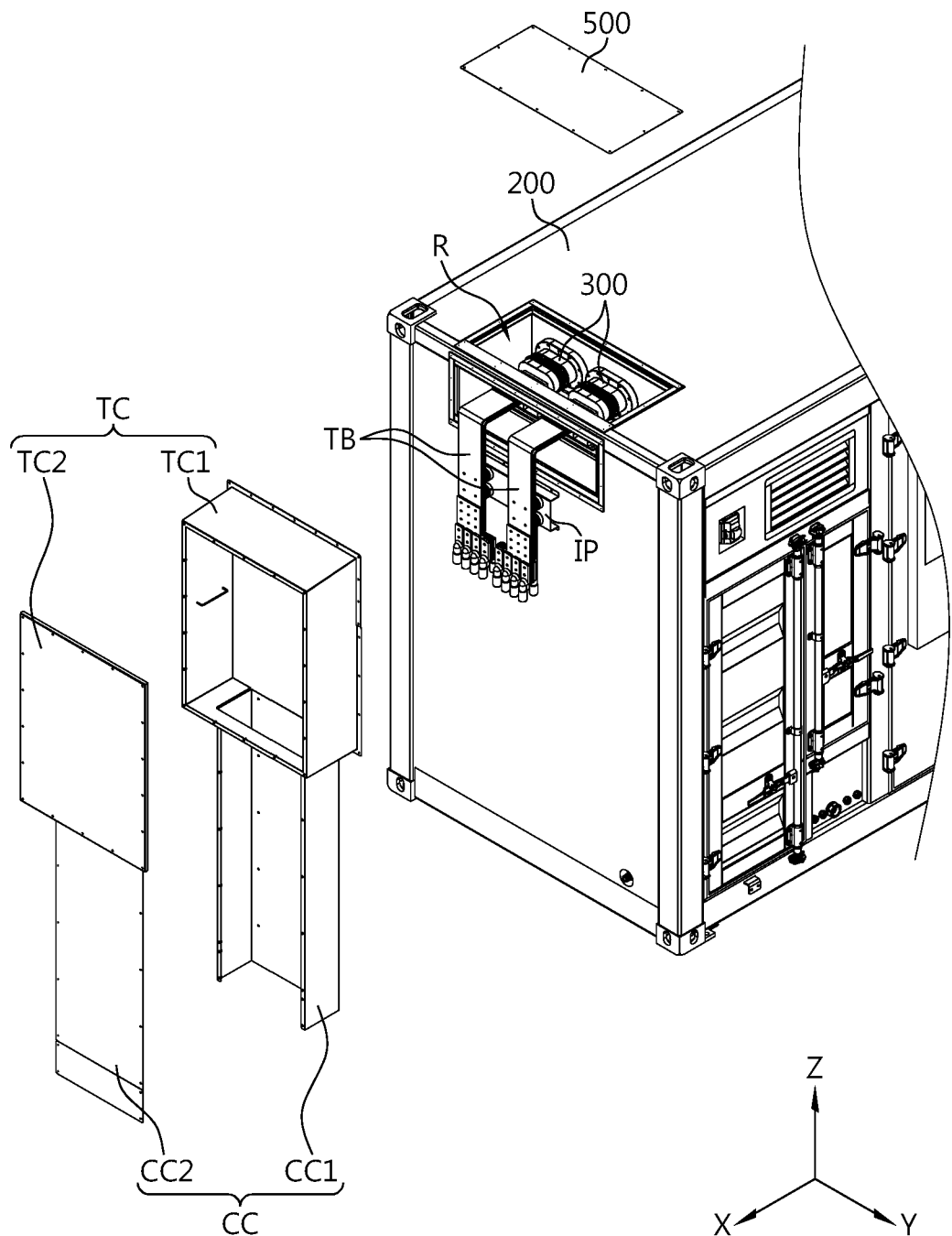
FIG. 21 is an exploded perspective view showing a portion of the battery container of FIG. 20.

FIG. 20 is a perspective view schematically showing the configuration of a battery container 1000 according to still another aspect of the present disclosure. FIG. 21 is an exploded perspective view showing a portion of the battery container 1000 of FIG. 20.

For example, the battery container 1000 shown in FIG. 21 may be regarded as representing a left connection portion of the leftmost battery container 1000 directly connected to the control container 2000 in each link group, among the plurality of battery containers 1000 shown in FIG. 19.

Referring to FIGS. 20 and 21, the battery container 1000 may include a terminal bus bar TB, an insulation panel IP, and/or a terminal cover TC.

The terminal bus bar TB may be connected to the main connector 300 that is directly connected to the control container 2000. For example, in the aspect of FIGS. 20 and 21, the terminal bus bar TB may be connected to the left main connector 300 of the battery container 1000 positioned at the leftmost side in each link group. Also, the other end of the terminal bus bar TB may be connected to the link line L2.

The terminal bus bar TB may be made of an electrically conductive material. In addition, the terminal bus bar TB may be configured in a plate shape. For example, the terminal bus bar TB may be formed in the form of a metal plate. In this case, the terminal bus bar TB may be stably mounted to the outer wall of the container housing 200. In addition, the terminal bus bar TB may include two terminal bus bars having different polarities, namely a positive electrode terminal bus bar and a negative electrode terminal bus bar, in order to transmit power.

Moreover, the terminal bus bar TB may be configured to extend from the main connector 300 located inside the connector accommodation portion R to the outside of the connector accommodation portion R and be bent along the outer wall of the container housing 200. In particular, when the main connector 300 is located at the upper side of the container housing 200, the terminal bus bar TB may have a shape that extends from the main connector 300 in a horizontal direction and then is bent downward. In this case, the external protrusion of the terminal bus bar TB is suppressed, and the connection work between the terminal bus bar TB and the link line L2 may be performed more easily. In addition, in this case, since the end of the terminal bus bar TB faces downward, the underground configuration of the link line L2 connected thereto may be more easily implemented.

The insulation panel IP may electrically insulate the terminal bus bar TB and the container housing 200 from each other. To this end, the insulation panel IP may include an electrical insulating material such as rubber, silicone, or plastic. Moreover, the insulation panel IP may be interposed between the terminal bus bar TB and the container housing 200 so that the terminal bus bar TB is separated from the outer surface of the container housing 200 by a predetermined distance. In addition, the insulation panel IP may be made of an elastic material to suppress the transfer of shock or vibration between the terminal bus bar TB and the container housing 200.

The terminal cover TC may be configured to protect the terminal bus bar TB. To this end, the terminal cover TC may be configured to surround the outer side of the terminal bus bar TB. For example, the terminal cover TC may include a shroud panel as indicated by TC1 and a shroud cover as indicated by TC2. Here, the shroud panel TC1 is formed in a substantially square ring shape, and may be configured to cover the side surface, such as the upper portion, the lower portion, the front side, and the rear side, of the terminal bus bar TB. Also, the shroud cover TC2 is configured in a substantially plate shape, and may be configured to cover the open side of the shroud panel TC1. Therefore, the shroud cover TC2 may cover the left side of the terminal bus bar.

According to this aspect, the terminal bus bar may be stably protected from external physical and chemical factors. Also, in this aspect, the shroud cover TC2 may be separable from the shroud panel TC1. In this case, by separating the shroud cover TC2, the terminal bus bar TB may be connected, separated or repaired easily.

In addition, the battery container 1000 according to the present disclosure may include a cable cover CC. The cable cover CC may be configured to surround a cable connected to the battery container 1000. For example, a plurality of power cables may be connected to the terminal bus bar TB to transfer power. In this case, the cable cover CC may be located at one end, for example a lower end, of the terminal cover TC to protect a plurality of power cables connected to the terminal bus bar TB. Alternatively, the battery container 1000 may be connected to a data cable to exchange various data with other external components, such as the control container 2000. In this case, the cable cover CC may be configured to protect data cables or the like connected to the battery container 1000 from the outside.

In particular, the cable cover CC may include a cable tray CC1 and a tray cover CC2. The cable tray CC1 may include a body portion attached to an outer wall of the container housing 200 and a sidewall portion protruding outward from an edge of the body portion. For example, the sidewall portion may be formed to protrude to the left from the front edge and the rear edge of the body portion. The tray cover CC2 may be coupled to the end of the sidewall portion protruding from the body portion of the cable tray CC1 to form an empty space therein together with the body portion and the sidewall portion. In particular, this empty space may be formed in a hollow shape. Accordingly, the cable may extend outward from the battery container 1000 through the empty space of the cable cover CC. In addition, the cable extending to the outside may be connected to other external components, such as the control container 2000 or another battery container 1000.

According to this aspect, by minimizing the exposure of the cable extending from the battery container 1000 to the outside, it is possible to protect the cable and prevent damage or breakage of the cable. Moreover, the cable cover CC is configured to have a hollow formed downward at the side surface of the container housing, so that the cable accommodated inside may be exposed downward to the outside. In this case, it may be advantageous for installation, management, and undergrounding of the cable.

In addition, the battery container 1000 according to the present disclosure may further include an air conditioning module 600 as shown in FIGS. 1 and 2.

The air conditioning module 600 may be configured to regulate air inside the container housing 200. In particular, the air conditioning module 600 may control the temperature state of an internal air. Moreover, the air conditioning module 600 may be configured to circulate air inside the container housing 200 to control the temperature of various electronic equipment such as the battery rack 100 or the rack BMS included in the battery container 1000 within a certain range. In particular, the air conditioning module 600 may cool the air inside the container housing 200. For example, the air conditioning module 600 may be configured to absorb heat from the air inside the container housing 200 and discharge the heat to the outside. In addition, the air conditioning module 600 may be configured to remove dust or foreign substances from the air inside the container housing 200.

Representatively, the air conditioning module 600 may include at least one HVAC (Heating, Ventilation, & Air Conditioning). For example, the battery container 1000 according to the present disclosure may include four HVACs. The HVAC may allow air to circulate inside the container housing 200. In this case, the temperature of the battery rack 100 may be lowered, and a temperature difference between the battery racks 100 included in the container housing 200 or between the battery modules 110 may be reduced.

In particular, the container housing 200 may include at least one door, as indicated by E in FIGS. 1 and 2, to facilitate installation, maintenance, or repair of the battery rack 100. For example, the container housing 200 may have eight doors E on the front side. Also, two doors E may be opened and closed as a pair in a casement form. In addition, such a door E may be additionally provided on another part of the container housing 200, for example at the rear surface.

In this way, when the door E is provided to the container housing 200, the HVAC may be installed in the door E of the container housing 200. For example, when two doors E are configured as a pair, the HVAC may be provided to one of the two doors E. In addition, the HVAC, namely the air conditioning module 600, may be configured to penetrate the container housing 200, particularly the door E. In this case, one surface of the air conditioning module 600 may be exposed to the outside of the container housing 200, and the other surface of the air conditioning module 600 may be exposed to the inside of the container housing 200. Accordingly, the inner surface of the air conditioning module 600 may contact the internal air of the container housing 200 to absorb heat, and the outer surface of the air conditioning module 600 may contact the external air of the container housing 200 to discharge heat.

The air conditioning module 600 may be configured to prevent direct contact between internal air and external air. That is, the air conditioning module 600 may be configured to prevent internal air from being discharged to the outside and to prevent external air from being introduced into the inside. Therefore, even if the temperature inside the container housing 200 rises, the air conditioning module 600 may absorb only heat from the internal air and discharge the heat to the outside without directly discharging the internal air to the outside. According to this aspect, even if a fire or toxic gas is generated inside the battery container 1000, it is possible to prevent the fire or toxic gas from being discharged to the outside and causing damage to other devices such as other nearby battery containers 1000 or workers at the outside.

In addition, the battery container 1000 according to the present disclosure may further include a venting module 700 as shown in FIGS. 1 and 2.

The venting module 700 may be configured to discharge gas inside the container housing 200 to the outside. In addition, the venting module 700 may introduce an external air of the container housing 200 into the inside. Accordingly, the venting module 700 may function as a ventilation device. That is, the venting module 700 may exchange or circulate gas between the inside and the outside of the container housing 200.

In particular, the venting module 700 may be configured to operate in an abnormal situation, such as when a venting gas or fire is generated in a specific battery module 110. Moreover, the venting module 700 may be configured to discharge gas to the outside when the gas or the like is generated inside the container housing 200 due to a thermal runaway phenomenon or the like of the battery rack 100. Moreover, the venting module 700 may be configured to be in a closed state in a normal state and be switched to an open state in an abnormal state such as a thermal runaway situation. In this case, since the venting module 700 performs active ventilation, the venting module 700 may be referred to as an AVS (Active Ventilation System) or include such a system.

In this case, it is possible to prevent a larger problem such as an explosion from occurring due to an increase in the internal pressure of the battery container 1000. In addition, in this case, by rapidly discharging a combustible gas inside the container housing 200 to the outside, it is possible to lower the possibility of a fire in the battery container 1000 or delay the occurrence of a fire, and the scale of a fire may be reduced.

Meanwhile, in the aspect where both the venting module 700 and the air conditioning module 600 are included, in a normal situation, the venting module 700 may not operate, but the air conditioning module 600 may operate. In this case, in the process of cooling, it is possible to prevent foreign substances or moisture from flowing into the container housing 200 through the venting module 700.

According to this aspect, since the air conditioning module 600, the venting module 700, and the like are included in the battery container 1000, just by transporting and installing the battery container 1000, the air conditioning module 600 or the venting module 700 may be transported and installed together. Therefore, on-site installation work for installing the energy storage system may be minimized, and the connection structure may be simplified.

In this aspect, the air conditioning module 600 and/or the venting module 700 may operate under the control of the control container 2000. Alternatively, the air conditioning module 600 and/or the venting module 700 may be controlled by a control unit included in the battery container 1000, such as a rack BMS that controls the charge/discharge operation of each battery rack 100 or another separate control unit.

In addition, the battery container 1000 according to the present disclosure may include at least one sensor and provide sensing information to the rack BMS included in the battery container 1000, another separate control unit, or the control container 2000. For example, a temperature sensor, a smoke sensor, an H2 sensor, and/or a CO sensor may be included in the battery container 1000. In this case, the operation of the air conditioning module 600 and/or the venting module 700 may be controlled based on the information sensed by these sensors.

Figure 22:
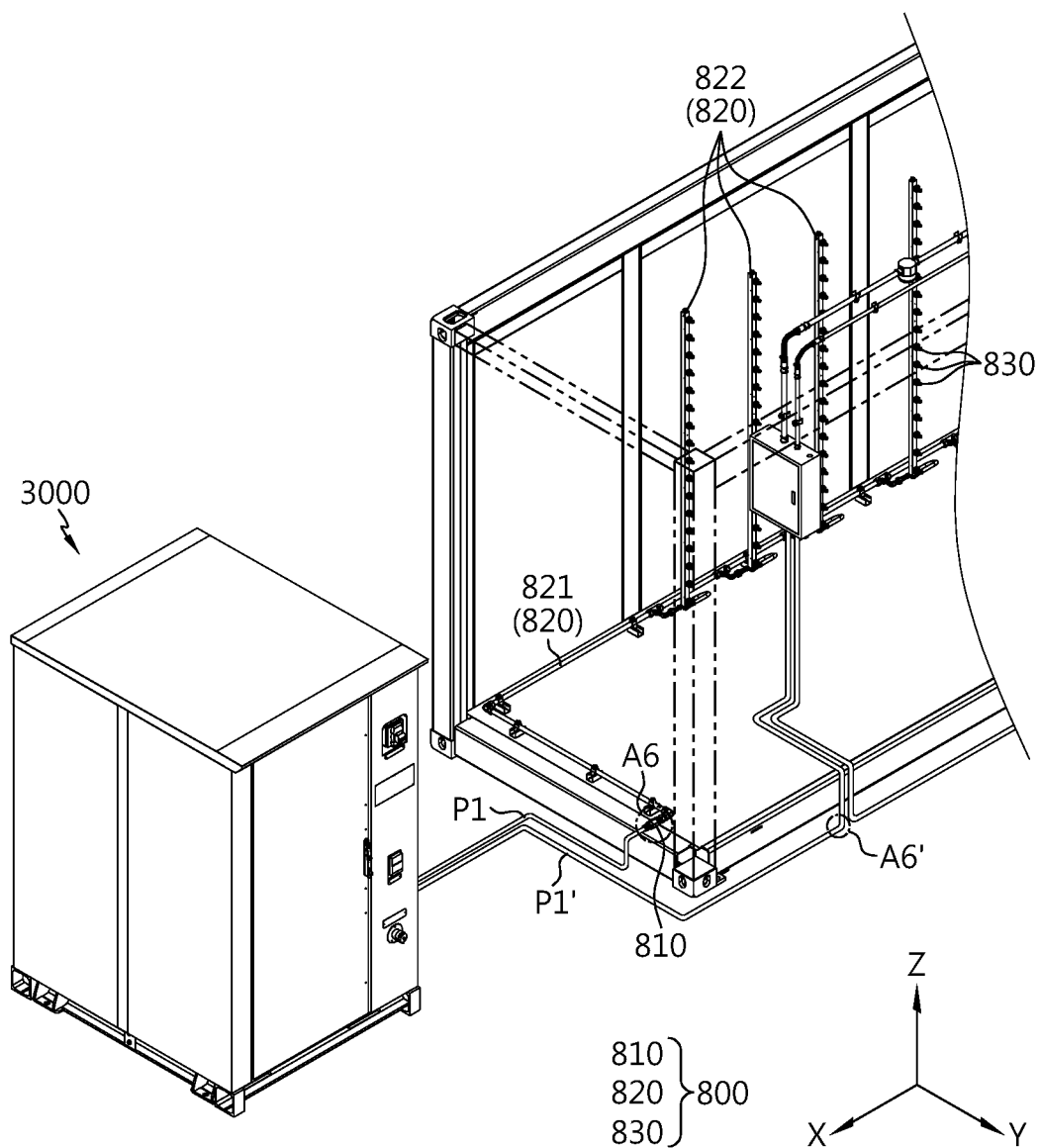
FIG. 22 is a diagram schematically showing some components of an energy storage system including a battery container according to still another aspect of the present disclosure.
Figure 23:
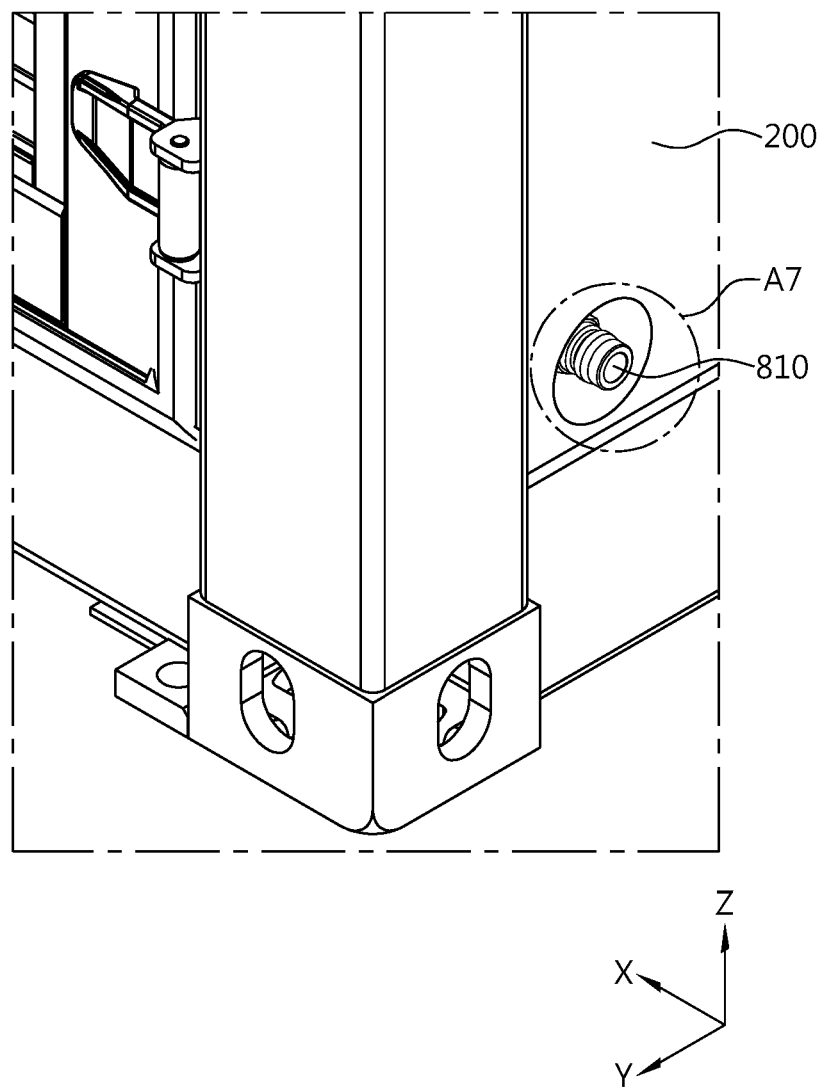
FIG. 23 is an enlarged view showing a portion of the battery container according to still another aspect of the present disclosure.

FIG. 22 is a diagram schematically showing some components of an energy storage system including a battery container 1000 according to still another aspect of the present disclosure. Also, FIG. 23 is an enlarged view showing a portion of the battery container 1000 according to still another aspect of the present disclosure. In particular, FIG. 23 may be an enlarged view showing a right bottom of the battery container 1000. Also, FIG. 24 is a diagram schematically showing a connection form of a firefighting module 800 for two battery containers 1000 according to an aspect of the present disclosure.

Figure 24:
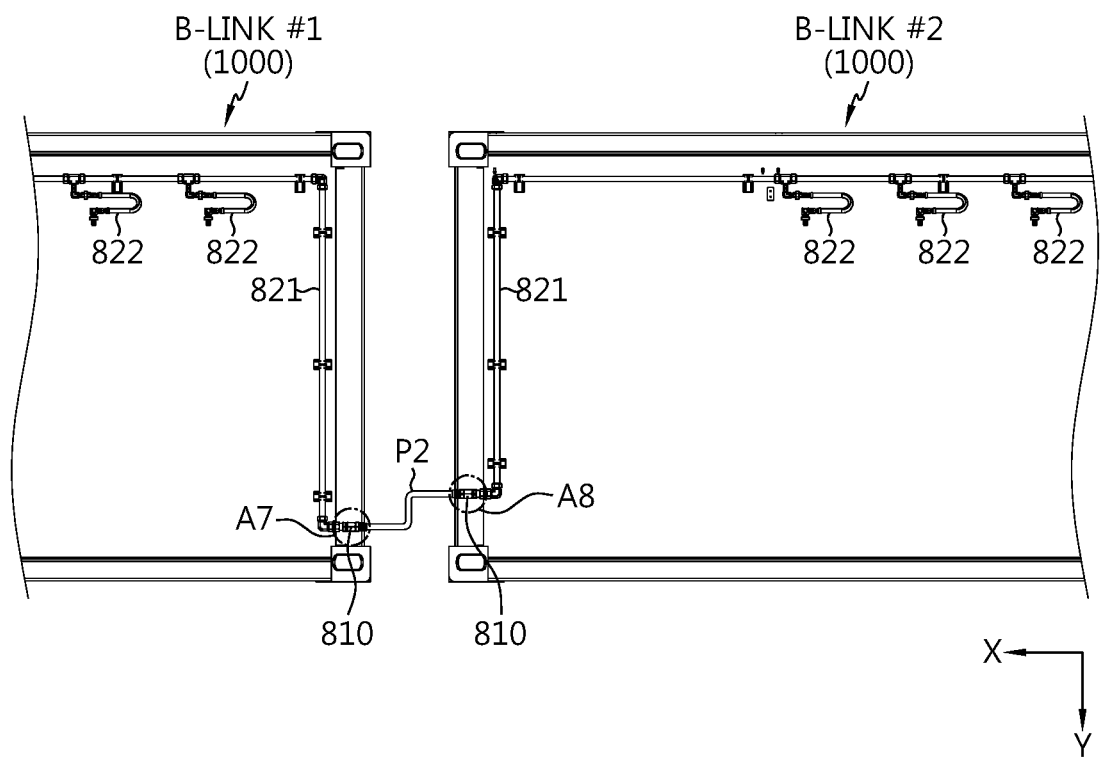
FIG. 24 is a diagram schematically showing a connection form of a firefighting module for two battery containers according to an aspect of the present disclosure.

Referring to FIGS. 22 to 24, the battery container 1000 according to the present disclosure may include a firefighting module 800.

The firefighting module 800 may be configured to receive a fire extinguishing liquid from the outside. Here, the fire extinguishing liquid may be water. For example, referring to FIGS. 19 and 22, an external firefighting device 3000 for supplying a fire extinguishing liquid (water) to the battery container 1000 may be provided outside the battery container 1000. The external firefighting device 3000 may be included in the energy storage system according to the present disclosure. The external firefighting device 3000 may be referred to as a WIU (Water Injection Unit) or a WIS (Water Injection System). Also, the external firefighting device 3000 may supply a fire extinguishing liquid to the firefighting module 800 of the battery container 1000.

The firefighting module 800 may be configured to supply the fire extinguishing liquid supplied from the external firefighting device 3000 toward the battery rack 100. In particular, the firefighting module 800 may prevent or suppress a fire by supplying the fire extinguishing liquid, for example water, when a fire or the like occurs inside the battery container 1000.

The firefighting module 800 may include a firefighting connector 810, a firefighting pipe 820, and/or an injection nozzle 830.

The firefighting connector 810 may be provided to be exposed on the outer wall of the container housing 200, as indicated by A5 in FIG. 1, A6 in FIG. 22, and A7 in FIG. 23. Also, as shown in FIG. 22, a supply pipe P1 connected to the external firefighting device 3000 may be connected to the firefighting connector 810. Accordingly, the fire extinguishing liquid supplied from the external firefighting device 3000 may be supplied to the inside of the container housing 200 through the firefighting connector 810 via the supply pipe P1. The firefighting connector 810 may be located below the container housing 200. In this case, interference with the main connector 300 or the like located above the container housing 200 may be avoided or minimized.

At least a part of the firefighting pipe 820 is provided in the inner space of the container housing 200, and one end thereof may be connected to the firefighting connector 810. In addition, the external fire extinguishing liquid supplied through the firefighting connector 810 may be transferred to a specific space inside the container housing 200. In particular, the firefighting pipe 820 may be at least partially embedded inside the beam constituting the container housing 200, or attached and fixed to the inner wall of the container housing 200.

The firefighting pipe 820 may include a main pipe 821 and a branch pipe 822.

One end of the main pipe 821 may be connected to the firefighting connector 810 to provide the fire extinguishing liquid supplied from the outside to the branch pipe 822.

Moreover, the main pipe 821 may have a shape elongated in a horizontal direction, for example in the left and right direction, along the longitudinal direction of the battery container 1000.

The branch pipe 822 may be configured in a form in which one main pipe 821 is branched into a plurality of pipes. In particular, the branch pipe 822 may be provided to correspond to each of a plurality of module stacks (formed by stacking a plurality of battery modules 110) disposed in the horizontal direction inside the battery container 1000. At this time, one or more module stacks may constitute the battery rack 100.

For example, when ten module stacks are included inside the container housing 200 in the horizontal direction, ten branch pipes 822 may be included in the firefighting pipe 820. Also, each branch pipe 822 may supply a fire extinguishing liquid to the battery modules 110 included in each module stack. Moreover, the branch pipe 822 may have a shape elongated in a vertical direction corresponding to the stacked shape of the battery modules 110.

As shown in FIG. 22, the main pipe 821 may be provided on the lower portion of the container housing 200, particularly on the bottom surface. In addition, the branch pipe 822 may have a shape elongated in the upper direction from the main pipe 821 disposed at the lower portion as described above. In this case, the fire extinguishing liquid in each branch pipe 822 may be supplied upward from the lower portion. According to this aspect, in the inner space of the branch pipe 822 elongated in the upper and lower directions, it is possible to ensure that the fire extinguishing liquid is easily filled as a whole and no empty space exists. Accordingly, the fire extinguishing liquid may be sufficiently supplied to any battery module 110 among the battery modules 110 stacked in the upper and lower directions.

In particular, even in a normal state, the main pipe 821 and/or the branch pipe 822 may remain filled with the fire extinguishing liquid. In this case, when a fire occurs, the fire extinguishing liquid may be supplied rapidly.

The injection nozzle 830 is located in the branch pipe 822 and may be configured to inject a fire extinguishing liquid toward the battery module 110. The injection nozzle 830 may include a glass bulb or may be implemented as a glass bulb. In this case, when a fire occurs, the glass bulb is broken, so that the fire extinguishing liquid existing inside the branch pipe 822 may be ejected to the outside.

The injection nozzle 830 may be disposed in plurality along the upper and lower direction, which is an extension direction of the branch pipe 822. Moreover, the injection nozzle 830 may be provided to each battery module 110 in one-to-one relationship. Also, the injection nozzle 830, particularly the glass bulb, may be configured to be inserted into the battery module 110.

Therefore, when a fire occurs in a specific battery module 110, the fire extinguishing liquid may be quickly supplied to the corresponding battery module 110. Moreover, in this case, the fire extinguishing liquid is not supplied to other battery modules 110 in a normal state, and the fire extinguishing liquid may be intensively injected into the battery module 110 having a problem. Therefore, normal or emergency operation of the battery container 1000 may be possible, while minimizing damage to the normal battery module 110 included in the battery container 1000.

Meanwhile, the external firefighting device 3000 may be configured to supply a fire extinguishing liquid to the battery container 1000 in a normal or abnormal situation and recover the supplied fire extinguishing liquid. For example, as shown in FIG. 22, the external firefighting device 3000 may recover the fire extinguishing liquid from the battery container 1000 through a recovery pipe indicated by P1'. To this end, the battery container 1000 may have a separate firefighting connector 810 at a portion indicated by A6'. In this case, it may be regarded that the portion indicated by A6 functions as an inlet and the portion indicated by A6' functions as an outlet.

In addition, the firefighting module 800 may be configured to supply a fire extinguishing liquid supplied from the outside to another battery container 1000.

For example, the battery container 1000 may have a firefighting connector 810 at the left portion as indicated by A6 in FIG. 22. In addition, the battery container 1000 may also have a firefighting connector 810 at the right portion, as indicated by A7 in FIG. 23. That is, the battery container 1000 may have firefighting connectors 810 on at least different side surfaces, for example on opposite side surfaces. Also, the main pipe 821 and/or the branch pipe 822 may be connected between the firefighting connectors 810 formed on different side surfaces.

Referring to FIG. 24, the firefighting connectors 810 provided in two battery containers 1000 may be connected to each other through a separate connection pipe P2. Here, the connection pipe P2 may be made of a flexible material or shape. Also, the connection pipe P2 may transfer a fire extinguishing liquid between two battery containers 1000.

For example, the left container in FIG. 24 is the first container B-LINK #1, and may indicate the right portion of the container shown in FIG. 22. Also, the right portion of the battery container 1000 of FIG. 23 may be applied to the right portion of the first container B-LINK #1 of FIG. 24. For example, the portion A7 provided with the firefighting connector 810 in FIG. 23 may be referred to as a configuration identically applied to the portion indicated by A7 in FIG. 24. Also, the right container of FIG. 24 is the second container B-LINK #2, and may have the same firefighting module 800 as the battery container 1000 of FIG. 22. For example, in the second container B-LINK #2 of FIG. 24, at the portion indicated by A8, the firefighting connector 810 may be provided in a form identical or similar to the portion indicated by A8 in FIG. 22. As such, two battery containers 1000 shown in FIG. 24 are battery containers according to an aspect of the present disclosure, and may be configured in the same form, and may not be manufactured separately. Therefore, an energy storage system may be constructed using only the same type of battery containers 1000, and compatibility may be achieved no matter where the battery container 1000 is located.

In the aspect of FIG. 24, the second container B-LINK #2 may receive a fire extinguishing liquid from the first container B-LINK #1 through the connection pipe P2. More specifically, the fire extinguishing liquid supplied from the external firefighting device 3000 through the main pipe 821 of the first container B-LINK #1 may be transferred to the main pipe 821 of the second container B-LINK #2 via the connection pipe P2. Also, the fire extinguishing liquid transferred to the main pipe 821 of the second container B-LINK #2 may be supplied to the branch pipe 822 of the second container B-LINK #2. In addition, although not shown in the drawing, when another battery container 1000, for example a third container, is located on the right side of the second container B-LINK #2, between the second container B-LINK #2 and the third container, a fire extinguishing liquid may be transferred through the connection pipe P2 in a similar form as shown in FIG. 24.

According to this aspect of the present disclosure, in the energy storage system including several battery containers 1000, a configuration for supplying a fire extinguishing liquid to each battery container 1000 may be easily achieved. In particular, according to this aspect, it is not necessary to separately provide a configuration for storing and supplying a fire extinguishing liquid such as water for each battery container 1000. Also, according to this aspect, in order to receive a fire extinguishing liquid from the external firefighting device 3000 such as the WIU, it is not necessary to separately provide a long supply pipe P1 from each battery container 1000 to the external firefighting device 3000. Therefore, when constructing an energy storage system, the fire extinguishing facility may be constructed or installed more simply. In particular, according to this aspect, it is sufficient if the supply pipe P1 is connected to the battery container 1000 closest to the external firefighting device 3000, and the supply pipe P1 does not need to be directly connected to the external firefighting device 3000 individually for every other battery container 1000. Therefore, the length of the supply pipe P1 for supplying a fire extinguishing liquid from the external firefighting device 3000 to the battery container 100 may be shortened.

Therefore, according to this aspect, not only the safety of the battery container 1000 against a fire may be improved, but also the convenience or process efficiency of installation for implementing such a safety-enhancing structure may be improved. In addition, in this case, cost and time for preparing the fire extinguishing equipment may be reduced. In addition, in this aspect, when adding the battery container 1000 in the energy storage system, the firefighting module 800 already provided to battery container 1000 in a built-in form may be used. Therefore, when expanding the scale of the energy storage system, safety facilities against fire may be prepared quickly and conveniently.

The battery container 1000 according to the present disclosure may further include a communication terminal. The communication terminal may be provided to transmit and/or receive various types of information or data to/from other external components. For example, in the aspect of FIG. 19, a communication terminal of the battery container 1000 may be connected to the control container 2000, another battery container 1000, and/or the external firefighting device 3000 through a communication cable. Here, the communication cable may be the data cable described above with reference to FIGS. 20 and 21.

The communication terminal may be provided on one side surface of the battery container 1000. For example, the communication terminal may be provided at a portion indicated by A9 in FIG. 1. The communication terminal may be exposed to the outside or covered by the door E provided in the container housing 200 or a separate cover.

As a more specific example, a DC/communication cable connected to the external firefighting device 3000 may be connected to the communication terminal. In this case, the operating power and/or signal of the external firefighting device 3000 may be transferred through the cable.

As another example, a DC/communication cable may be connected between two battery containers 1000 through the communication terminal. In this case, the operating power or communication signal may be exchanged between the two battery containers 1000 through the connection configuration between the communication terminals.

The battery container 1000 according to the present disclosure may have its own fire extinguishing system, separately from the firefighting module 800 described above with reference to FIGS. 22 to 24. For example, the battery container 1000 may include a built-in fire extinguishing module configured to inject a fire extinguishing material such as Novec-1230 after detecting an abnormal situation such as a fire through a temperature sensor or a smoke sensor.

In addition, the battery container 1000 according to the present disclosure may further include a display module for displaying information about a state of the battery container 1000. For example, the battery container 1000 according to the present disclosure may include a warning sound generating device or a display device, as a display module for indicating a normal state or an abnormal state such as failure, overheating, fire, overcharging, and overdischarging.

The battery container 1000 may further include various other components known at the time of filing of this application. For example, the battery container 1000 may further include electrical components such as an AC/DC panel. Also, the battery container 1000 may include at least one control module. Here, the control module may be configured to control charging/discharging operations of the battery module 110 included in the battery container 1000 or exchange data with other components outside the battery container 1000. For example, the control module may be a rack BMS included in each battery rack 100. Alternatively, the battery container 1000 may include a plurality of battery systems and a plurality of control modules. At this time, the battery system may include at least one battery rack 100. In addition, each battery system includes a separate control module, so that the corresponding battery system may be independently controlled.

The energy storage system according to the present disclosure includes the battery container 1000 according to the present disclosure. Moreover, the energy storage system according to the present disclosure may include two or more battery containers 1000. At this time, since battery container 1000 included in the energy storage system according to the present disclosure or its connection configuration may be applied as described above, and thus will not be described in detail again.

In addition, the energy storage system according to the present disclosure may further include a control container 2000 or the like for controlling various operations such as charging and discharging operations of at least one battery container 1000, in addition to the battery container 1000.

In addition, the energy storage system according to the present disclosure may further include the external firefighting device 3000, the PCS, and the like described above.

The present disclosure has been described in detail. However, it should be understood that the detailed description and specific examples, while indicating preferred aspects of the disclosure, are given by way of illustration only, since various changes and modifications within the scope of the disclosure will become apparent to those skilled in the art from this detailed description.

REFERENCE SIGNS

100: battery rack
110: battery module
200: container housing
300: main connector
301: first connector, 302: second connector
310: positive electrode connector, 320: negative electrode connector
400: main bus bar
410: positive electrode bus bar, 420: negative electrode bus bar
500: connector cover 510: upper cover, 520: side cover
600: air conditioning module
700: venting module
800: firefighting module
810: firefighting connector, 820: firefighting pipe, 830: injection nozzle
821: main pipe, 822: branch pipe
900: link cover
910: bottom cover, 920: top cover, 930: guide cover
1000: battery container
2000: control container
3000: external firefighting device
L1: link bus bar
L2: link line
R, R1, R2: connector accommodation portion
F: coupling reinforcing portion
C: sealing member
TB: terminal bus bar, TC: terminal cover
TC1: shroud panel, TC2: shroud cover
E: door
P1: supply pipe, P1': recovery pipe
P2: connection pipe

What is claimed is:

1. A battery container comprising: at least one battery rack including a plurality of batteries;
a container housing having: an inner space formed therein to accommodate the at least one battery rack; and
a connector accommodation portion having a concave shape and formed at a junction of a top wall and a first side of the container housing to be opened in upper and side directions at a top edge portion of the container housing;
a first main connector located in the connector accommodation portion of the container housing on the container housing, the first main connector being configured to be electrically connected to the outside; and
a main bus bar connected to the first main connector to transmit power.

2. The battery container according to claim 1, further comprising a second main connector located on a second side of the container housing, the second side being opposite to the first side,
wherein the main bus bar extends between the first main connector and the second main connector.

3. The battery container according to claim 1,
wherein a first cover attaches to the top wall and closes a top of the connector accommodation portion, and
wherein a second cover attaches to the first side and closes a side of the connector accommodation portion.

4. The battery container according to claim 1, wherein the first main connector is configured to be exposed to outside of the container housing.

5. The battery container according to claim 1, further comprising:
a connector cover configured to cover an outer side of the connector accommodation portion.

6. The battery container according to claim 1, further comprising:
a link cover configured to be coupled to and extend outwardly from a side of the connector accommodation portion and configured to surround a link bus bar connected to the first main connector.

7. The battery container according to claim 1, further comprising:
an air conditioning module configured to regulate the inner space of the container housing.

8. The battery container according to claim 1, further comprising:
a venting module configured to discharge an internal gas of the container housing to the outside.

9. The battery container according to claim 1, further comprising:
a firefighting module configured to supply a fire extinguishing liquid supplied from outside to the battery rack.

10. The battery container according to claim 9, wherein the firefighting module is configured to supply the fire extinguishing liquid supplied from the outside to another battery container.

11. An energy storage system, comprising the battery container according to claim 1.

12. The battery container according to claim 1, wherein the main bus bar is configured to transmit DC power.

13. The battery container according to claim 1, wherein the main bus bar is disposed in the inner space of the container housing.

14. A battery container comprising:
at least one battery rack including a plurality of batteries;
a container housing having:
an inner space formed therein to accommodate the at least one battery rack; and
a connector accommodation portion having a concave shape and formed at a junction of a top wall and a first side of the container housing to be opened in upper and side directions at a top edge portion of the container housing;
a first main connector located in the connector accommodation portion of the container housing on the upper portion of the first side of the container housing, the first main connector being configured to be electrically connected to the outside; and
a main bus bar connected to the first main connector to transmit DC power, wherein the main bus bar is disposed in the inner space of the container housing.

15. The battery container according to claim 14, wherein the first main connector is further configured to be exposed to outside of the container housing.

16. The battery container according to claim 15, further comprising a connector cover configured to cover an outer side of the connector accommodation portion.

17. The battery container according to claim 15, further comprising a link cover configured to be coupled to a side of the connector accommodation portion and configured to surround a link bus bar connected to the first main connector.

18. The battery container according to claim 16, further comprising:
an air conditioning module configured to regulate the inner space of the container housing;
a venting module configured to discharge an internal gas of the container housing to the outside; and
a firefighting module configured to supply a fire extinguishing liquid supplied from outside to the battery rack.

19. The battery container according to claim 1, further comprising a bar extending along the junction of the top wall and the first side and across the connector accommodation portion.

* * * * *